(12) United States Patent
Roberts

(10) Patent No.: US 11,194,728 B2
(45) Date of Patent: Dec. 7, 2021

(54) MEMORY-AWARE PRE-FETCHING AND CACHE BYPASSING SYSTEMS AND METHODS

(71) Applicant: Micron Technology, Inc., Boise, ID (US)

(72) Inventor: David Andrew Roberts, Wellesley, MA (US)

(73) Assignee: Micron Technology, Inc., Boise, ID (US)

(*) Notice: Subject to any disclaimer, the term of this patent is extended or adjusted under 35 U.S.C. 154(b) by 70 days.

(21) Appl. No.: 16/525,106

(22) Filed: Jul. 29, 2019

(65) Prior Publication Data
US 2021/0034539 A1  Feb. 4, 2021

(51) Int. Cl.
*G06F 12/0888* (2016.01)
*G06F 12/0897* (2016.01)
*G06F 12/0862* (2016.01)

(52) U.S. Cl.
CPC ...... *G06F 12/0888* (2013.01); *G06F 12/0862* (2013.01); *G06F 12/0897* (2013.01)

(58) Field of Classification Search
CPC ............. G06F 12/0888; G06F 12/0862; G06F 12/0897; G06F 12/0804; G06F 12/0868
See application file for complete search history.

(56) References Cited

U.S. PATENT DOCUMENTS

| | | | | |
|---|---|---|---|---|
| 6,279,083 B1 * | 8/2001 | MacDonald | ........ | G06F 12/0888 711/105 |
| 2009/0077350 A1 * | 3/2009 | Saraswati | ........... | G06F 11/3409 712/207 |
| 2010/0070709 A1 * | 3/2010 | Mekhiel | .............. | G06F 12/0888 711/122 |
| 2011/0154002 A1 | 6/2011 | Liu et al. | | |
| 2012/0072672 A1 | 3/2012 | Anderson et al. | | |
| 2014/0115294 A1 | 4/2014 | Fleischer et al. | | |
| 2015/0212943 A1 | 7/2015 | Yang et al. | | |

FOREIGN PATENT DOCUMENTS

WO    2004053686 A1    6/2004

OTHER PUBLICATIONS

International Search Report and Written Opinion for PCT Application No. PCT/US2020/040362 dated Sep. 24, 2020; 12 Pages.

* cited by examiner

*Primary Examiner* — Michael Krofcheck
(74) *Attorney, Agent, or Firm* — Fletcher Yoder, P.C.

(57) ABSTRACT

Systems, apparatuses, and methods related to memory management are described. For example, these may include a first memory level including memory pages in a memory array, a second memory level including a cache, a pre-fetch buffer, or both, and a memory controller that determines state information associated with a memory page in the memory array targeted by a memory access request. The state information may include a first parameter indicative of a current activation state of the memory page and a second parameter indicative of statistical likelihood (e.g., confidence) that a subsequent memory access request will target the memory page. The memory controller may disable storage of data associated with the memory page in the second memory level when the first parameter associated with the memory page indicates that the memory page is activated and the second parameter associated with the memory page is greater than or equal to a threshold.

14 Claims, 9 Drawing Sheets

MEMORY-AWARE PRE-FETCHING AND CACHE BYPASSING SYSTEMS AND METHODS

BACKGROUND

The present disclosure generally relates to computing systems and, more particularly, to memory interfaces implemented in computing systems.

Generally, a computing system includes a processing sub-system and a memory sub-system, which may store data accessible to processing circuitry of the processing sub-system. For example, to perform an operation, the processing circuitry may execute corresponding instructions retrieved from a memory device implemented in the memory sub-system. In some instances, data input to the operation may also be retrieved from the memory device. Additionally or alternatively, data output (e.g., resulting) from the operation may be stored in the memory device, for example, to enable subsequent retrieval. However, at least in some instances, operational efficiency of a computing system may be limited by its architecture, for example, which governs the sequence of operations performed in the computing system.

BRIEF DESCRIPTION OF THE DRAWINGS

Various aspects of the present disclosure may be better understood upon reading the following detailed description and upon reference to the drawings in which.

DETAILED DESCRIPTION

Figure 1:
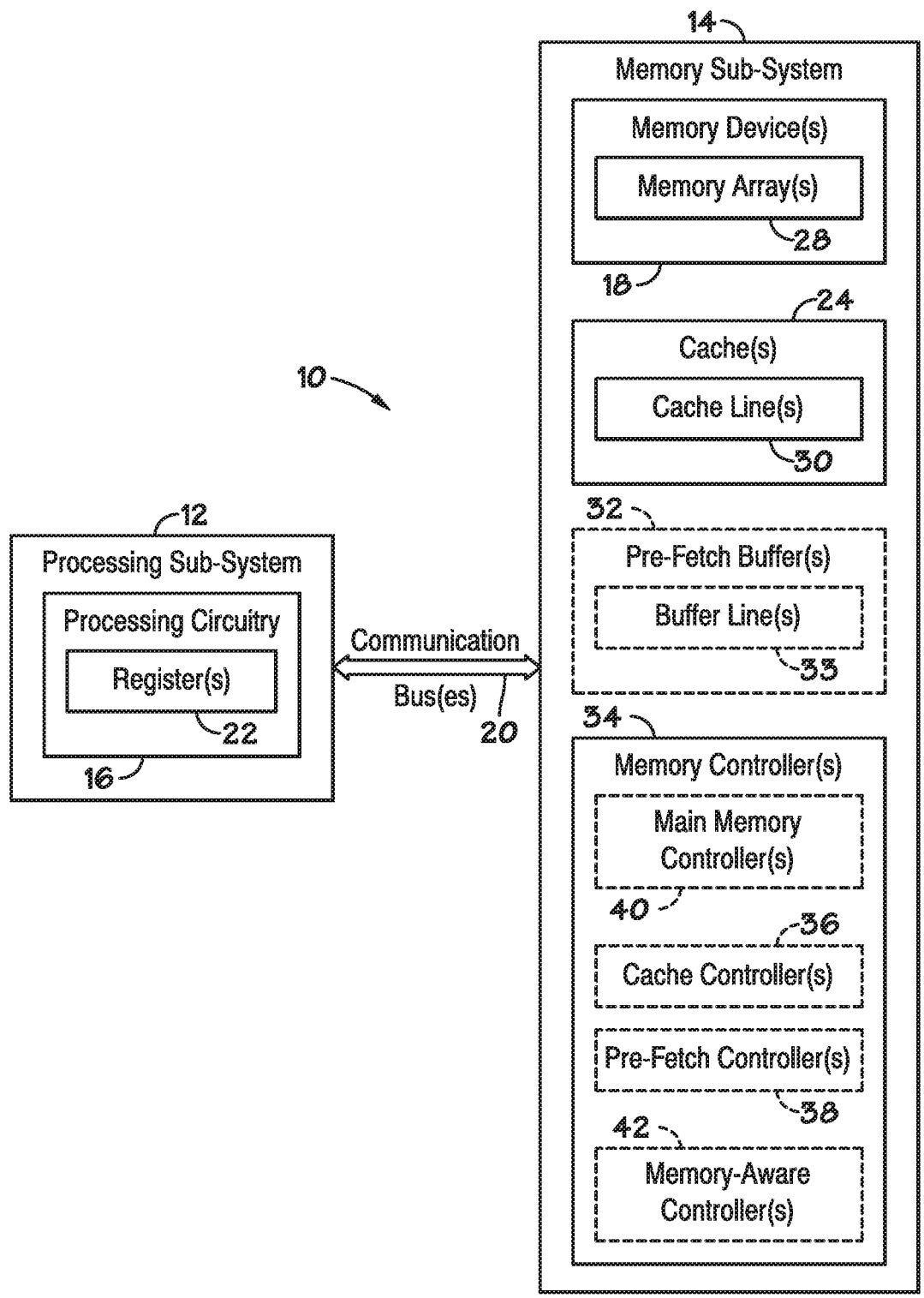
FIG. 1 is a block diagram of a computing system that includes a processing sub-system and a memory sub-system, in accordance with an embodiment of the present disclosure.

The present disclosure provides techniques that facilitate improving operational efficiency of computing systems, for example, by mitigating architectural features that may otherwise limit operational efficiency. Generally, a computing system may include various sub-systems, such as a processing sub-system and/or a memory sub-system. In particular, the processing sub-system may include processing circuitry, for example, implemented in one or more processors and/or one or more processor cores. The memory sub-system may include one or more memory device (e.g., chips or integrated circuits), for example, implemented on a memory module, such as a dual in-line memory module (DIMM), and/or organized to implement one or more memory arrays (e.g., array of memory cells).

Generally, during operation of a computing system, processing circuitry implemented in its processing sub-system may perform various operations by executing corresponding instructions, for example, to determine output data by performing a data processing operation on input data. Additionally, a processing sub-system may generally include one or more registers, which provide storage locations directly accessible to its processing circuitry. However, storage capacity of registers implemented in a processing sub-system is generally limited.

As such, a processing sub-system is often communicatively coupled to a memory sub-system that provides additional storage locations, for example, via a memory array implemented in one or more memory devices. Generally, a memory array may include memory cells coupled to word lines formed in a first (e.g., horizontal) direction and to bit lines formed in a second (e.g., vertical or orthogonal) direction. In some instances, the memory cells in a memory array may be organized into one or more memory pages, for example, each corresponding with a memory cell row of the memory array. In other words, at least in such instances, a memory page in the memory array may include each of the memory cells coupled a corresponding word line.

Additionally, in some instances, the memory cells in a memory page may be organized into one or more data block storage locations, for example, each corresponding with a memory cell column of the memory array. In other words, at least in such instances, a data block storage location in a memory page may include each of the memory cells coupled to one of multiple corresponding bit lines. Moreover, to facilitate reading (e.g., retrieving or loading) data from a memory array and/or writing (e.g., storing) data to the memory array, the bit lines of each column of the memory array may be coupled to corresponding amplifier circuitry, for example, which includes a driver (e.g., writing) amplifier and/or a sense (e.g., reading) amplifier. In other words, at least in some instances, a data block storage location in a memory array may be identified by a (e.g., physical)

memory address that includes a corresponding row (e.g., page) address and column address pairing.

To facilitate accessing storage locations in a memory array, the word lines of the memory array may be coupled to row select (e.g., decoder) circuitry and the amplifier circuitry, which is coupled to the bit lines of the memory array, may be coupled to column select (e.g., decoder) circuitry. For example, to enable (e.g., provide) access to storage locations in a specific memory page, the row select circuitry may activate the memory page by outputting an activation (e.g., logic high) control signal to a corresponding word line. Additionally, before activating a memory page in its deactivated state, in some instances, the row select circuitry may pre-charge the memory page, for example, by outputting a pre-charge control signal to a corresponding word line. Furthermore, to enable access to a specific data block storage location in an activated memory page, the column select circuitry may output a column select (e.g., logic high) control signal to corresponding amplifier circuitry, thereby enabling (e.g., instructing) the amplifier circuitry to write (e.g., store) a data block to the specific data block storage location and/or to read (e.g., retrieve or load) a data block currently stored at the specific data block storage location.

In some instances, a processor-side (e.g., host) of a computing system may request access to a storage location (e.g., memory address) in a memory sub-system via one or more memory access requests, which indicate access parameters to be used by the memory sub-system. For example, to store (e.g., write) a data block to the memory sub-system, the processor-side of the computing system may output a write memory access request that indicates one or more write access parameters, such as a virtual memory address used by processing circuitry to identify the data block, a physical memory address (e.g., row address and column address pairing) in the memory sub-system at which the data block is to be stored, size (e.g., bit depth) of the data block, and/or a write enable indicator (e.g., bit). Additionally or alternatively, to retrieve (e.g., read) a data block from the memory sub-system, the processor-side of the computing system may output a read memory access request that indicates read access parameters, such as a virtual memory address used by processing circuitry to identify the data block, a physical memory address (e.g., row address and column address pairing) in the memory sub-system at which the data block is expected to be stored, size (e.g., bit depth) of the data block, and/or a read enable indicator (e.g., bit).

In response to receipt of a read memory access request, a memory sub-system may search for a data block targeted by the read memory access request based at least in part on the read access parameters indicated in the read memory access request. For example, the memory sub-system may determine a target value of a tag (e.g., block identifier) parameter (e.g., metadata) expected to be associated with the target data block based at least in part on a virtual memory address and/or a physical memory address indicated in the read memory access request. Additionally, the memory sub-system may identify (e.g., find) the target data block by successively searching the value of tag parameters associated with valid data blocks stored therein against the target tag parameter value. Once a match is detected, the memory sub-system may identify an associated data block as the target data block and, thus, return the associated data block to the processing sub-system, for example, to enable processing and/or execution by its processing circuitry. Accordingly, at least in some instances, operational efficiency of a computing system may be dependent at least in part on data retrieval latency (e.g., duration before target data is returned) provided by its memory sub-system.

To facilitate improving data access speeds (e.g., retrieval latency), in some instances, total storage capacity of a memory sub-system may be distributed across multiple hierarchical memory levels (e.g., layers). Generally, a hierarchical memory sub-system may include a lowest memory level closest to the processing circuitry and a highest memory level farthest from the processing circuitry. Additionally, in some instances, the hierarchical memory sub-system may include one or more intermediate memory levels between the lowest memory level and the highest memory level. In other words, an intermediate memory level may be implemented farther from the processing circuitry compared to the lowest memory level and closer to the processing circuitry compared to the highest memory level.

Generally, when data is targeted (e.g., demanded and/or requested), a hierarchical memory sub-system may attempt to retrieve the target data from the lowest hierarchical before successively progressing to higher memory levels if the target data results in a miss (e.g., target tag value does not match any valid tag values). For example, the memory sub-system may check whether a target data block is currently stored in the lowest memory level. When the target data block results in a miss in the lowest memory level, the memory sub-system may then check whether the target data block is currently stored in the next lowest memory level, and so on.

Thus, to facilitate improving data access speeds, a hierarchical memory sub-system may be implemented such that a lower memory level generally (e.g., at least in on average) provides faster data access speed compared to a higher memory level. However, data access speed provided by a memory level may generally be dependent on its storage capacity, for example, since increasing storage capacity may enable an increase in the number of valid data blocks stored therein and, thus, potentially increase the amount of searching performed before a target data block is identified and returned. As such, to facilitate providing faster data access speeds, a lower memory level may be implemented with less (e.g., smaller) storage capacity compared to a higher memory level.

However, implementing a lower memory level with less storage capacity may limit the total storage capacity provided by a memory sub-system. As such, to facilitate maintaining or even increasing total storage capacity provided by the memory sub-system, a higher memory level may be implemented with more (e.g., larger) storage capacity compared to a lower memory level. In other words, a memory sub-system may be implemented with multiple hierarchical memory levels to facilitate balancing tradeoffs between average data access speed (e.g., operational efficiency) and total storage capacity provided.

To facilitate achieving the balance, in some instances, a memory sub-system may be implemented with multiple different memory types, which provide varying tradeoffs that affect operational efficiency and/or implementation associated cost. For example, volatile memory, such as dynamic random-access memory (DRAM) or static random-access memory (SRAM), may provide faster data transfer (e.g., read and/or write) speeds compared to non-volatile memory. Thus, to facilitate providing faster data access speeds, in some instances, a lower (e.g., second highest) memory level in a memory sub-system may be provided using a volatile memory array, for example, implemented in one or more volatile memory (e.g., DRAM) devices (e.g., modules or chips) coupled to a memory (e.g., external communication) bus.

On the other hand, non-volatile memory, such as flash (e.g., NAND) memory, phase-change memory (e.g., 3D XPoint™) memory, or ferroelectric random access memory (FeRAM), may provide higher (e.g., greater) data storage density compared to volatile memory. Additionally, non-volatile memory cells, in contrast to volatile memory cells, may maintain their stored values or data bits even while in an unpowered state. Thus, in some instances, a higher (e.g., highest) memory level in a memory sub-system may be provided using a non-volatile memory array, for example, implemented in one or more non-volatile memory (e.g., hard disk or solid state) devices (e.g., drives) coupled to the memory (e.g., external communication) bus.

To facilitate further improving operational efficiency, in addition to memory arrays, in some instances, a memory sub-system may include one or more dedicated (e.g., actual) lower memory levels implemented using a cache and/or a buffer, such as a pre-fetch buffer. Generally, a dedicated cache (e.g., lower memory level) may be implemented and/or operated to store (e.g., cache) a copy (e.g., instance) of a data block output from a processing sub-system for storage in a higher (e.g., memory array) memory level of the memory sub-system and/or a data block that is retrieved from the higher memory level in response to a (e.g., demand) memory access request received from the processor-side of the computing system. Additionally or alternatively, a memory sub-system may be implemented and/or operated to pre-fetch a data block, which is expected to be demanded (e.g., targeted or requested) by a processing sub-system during an upcoming control horizon (e.g., time period or one or more clock cycles), from a higher (e.g., memory array) memory level such that a copy of the data block is stored in a dedicated lower (e.g., cache and/or pre-fetch buffer) memory level before actually being demanded by the processing sub-system. As such, if a data block stored in the dedicated lower memory level is subsequently demanded, the memory sub-system may supply the demanded data block to the processing sub-system from the lower memory level instead of from the higher memory level, which, at least in some instances, may facilitate improving operational efficiency, for example, due to the lower memory level generally (e.g., on average) providing faster data retrieval latency compared to the higher memory level.

However, at least in some instances, data communication via an external communication bus, such as a memory bus, is generally slower than data communication via an internal communication bus, for example, due to timing differences between components on a processor-side of the memory bus and components on a memory-side of the memory bus, the memory bus being shared with other computing sub-systems, and/or communication distance along the memory bus. In other words, at least in some instances, data communication between (e.g., internal to) the processor-side components may be faster than data communication between the processor-side components and the memory-side components via the memory bus. Accordingly, to facilitate improving computing system operational efficiency, in some instances, a portion of a memory sub-system may be implemented on a processor-side of the memory bus and, thus, the computing system.

In other words, at least in some instances, a memory sub-system may include a processor-side (e.g., first) portion and a memory-side (e.g., second) portion communicatively coupled via a memory (e.g., external communication) bus. For example, the memory-side of the memory sub-system may include one or more memory-side caches, one or more memory-side pre-fetch buffers, one or more memory arrays, or any combination thereof. Additionally or alternatively, the processor-side of the memory sub-system may include one or more processor-side caches and/or one or more processor-side pre-fetch buffers.

Moreover, at least in some instances, each hierarchical memory level provided on a processor-side of a memory sub-system may be utilized as a lower (e.g., cache and/or pre-fetch buffer) memory level compared to a memory level implemented on a memory-side of the memory sub-system. As such, when a data block is demanded by a processing sub-system, the processor-side of the memory sub-system may determine whether the demanded data block is currently stored therein and, thus, whether the demanded data block results in a processor-side miss. When the demanded data block results in a processor-side miss, the processor-side of the memory sub-system may output a demand (e.g., read) memory access request, which targets return of the data block demanded by the processor sub-system, to a memory-side of the memory sub-system via a memory bus. Additionally or alternatively, the processor-side of the memory sub-system may predict what data block will be demanded by the processing sub-system during an upcoming control horizon and output a pre-fetch (e.g., read) memory access request, which targets return of the data block expected to be demanded by the processor sub-system, to the memory-side memory sub-system via the memory bus, for example, when the data block is not currently stored in the processor-side of the memory sub-system and, thus, results in a processor-side miss.

As described above, in response to receipt of a read memory access request, a memory sub-system may output (e.g., return) a data block targeted by the read memory access request to a memory bus. Additionally, as described above, a lower memory level generally provides faster data access speeds compared to a higher memory level. As such, at least in some instances, a processor-side of a memory sub-system may store a copy of a data block returned from a memory-side of the memory sub-system in a dedicated lower (e.g., cache and/or pre-fetch buffer) memory level implemented therein, which, at least in some instances, may facilitate improving computing system operational efficiency, for example, by enabling the data block to be supplied from the lower memory level instead of a higher memory level if the data block is subsequently demanded by the processing sub-system.

However, as described above, to facilitate providing faster data access speeds, a dedicated lower (e.g., cache and/or pre-fetch buffer) memory level may be implemented with less storage capacity compared to a higher memory level. As such, to make room for storage of a data block in a lower memory level, at least in some instances, another data block may be evicted from the lower memory level, for example, when the other data block is not expected to be targeted (e.g., demanded) during an upcoming control horizon. However, in some instances, storing a data block in a lower memory level may pollute the lower memory level and actually reduce computing system operational efficiency, for example, due to an evicted data block actually being targeted during the control horizon and, thus, being retrieved from a higher (e.g., memory array and/or memory-side) memory level instead of the lower memory level.

Moreover, as described above, a memory sub-system may provide access to one or more data block storage locations in an activated (e.g., open) memory page of a memory array. Additionally, as described above, a memory sub-system may activate a memory page at least in part by supplying an activation (e.g., logic high) control signal to a corresponding word line, for example, after supplying a pre-charge control signal to the corresponding word line to pre-charge the memory page. As such, at least in some instances, activating a deactivated (e.g., closed) memory page to provide access to one or more storage locations in the memory page may consume electrical power and/or incur an access delay and, thus, affect (e.g., reduce) operational (e.g., power usage and/or latency) efficiency of a computing system in which the memory sub-system is deployed.

Accordingly, to facilitate improving computing system operational efficiency, the present disclosure provides techniques for implementing and/or operating a memory sub-system to selectively disable storage of data blocks in a dedicated (e.g., actual) cache and/or a dedicated (e.g., actual) pre-fetch buffer based at least in part on the state of a memory array implemented in the memory sub-system. For example, based at least in part on the state of the memory array, the memory sub-system may selectively disable storage (e.g., caching) of a data block in a dedicated cache and instead artificially treat a currently activated memory page as a cache memory level (e.g., row buffer). Additionally or alternatively, based at least in part on the state of the memory array, the memory sub-system may selectively disable pre-fetching of a data block to a dedicated cache and/or a dedicated pre-fetch buffer and instead artificially treat a currently activated memory page as a lower (e.g., cache and/or pre-fetch buffer) memory level (e.g., row buffer), for example, due at least in part to data access latency provided by the currently activated memory page being similar to data access latency provided by the dedicated cache and/or the dedicated pre-fetch buffer.

In other words, as will be described in more detail below, the present disclosure provides techniques for implementing and/or operating a memory sub-system to control data storage therein based at least in part on the state of one or more memory arrays implemented in the memory sub-system. To facilitate controlling data storage, the memory sub-system may include one or more memory controllers (e.g., control circuitry and/or control logic). For example, when implemented on a processor-side of a memory bus and a memory-side of the memory bus, the memory sub-system may include a first (e.g., memory-side) memory controller implemented and/or operated to control data storage on the memory-side of the memory sub-system and a second (e.g., processor-side) memory controller implemented and/or operated to control data storage on the processor-side of the memory sub-system.

Additionally or alternatively, a memory controller may include multiple controllers (e.g., control circuitry and/or control logic), such as a cache controller, a pre-fetch controller, a main memory controller, and/or a memory-aware controller. In some embodiments, a cache controller may be implemented and/or operated to control data storage in one or more caches and, thus, corresponding cache (e.g., lower) memory levels of a memory sub-system, for example, by identifying one or more candidate data blocks to be considered for storage (e.g., caching) in a cache memory level in addition to being stored in a higher (e.g., memory array) memory level. Similarly, in some embodiments, a pre-fetch controller may be implemented and/or operated to control data storage in one or more pre-fetch buffers and, thus, corresponding pre-fetch buffer (e.g., lower) memory level of a memory sub-system. Additionally or alternatively, a pre-fetch controller may facilitate predictively controlling data storage in one or more lower (e.g., pre-fetch buffer and/or cache) memory levels of a memory sub-system, for example, by identifying one or more candidate data blocks to be considered for pre-fetching from a higher (e.g., memory array) memory level into a lower memory level.

Furthermore, in some embodiments, a main memory controller, such as a DRAM memory controller, may be implemented and/or operated to control data storage in one or more memory arrays and, thus, corresponding memory array (e.g., higher) memory levels. In particular, at least in some embodiments, a memory controller may control operation of a memory array in accordance with an open page policy, for example, such that a currently activated memory page remains activated until a different (e.g., currently deactivated) memory page is targeted at which point the currently activated memory page is deactivated and the different memory page is subsequently activated (e.g., after pre-charging). In other words, at least in such embodiments, an activation period of a memory page may span from the time the memory page is initially activated (e.g., to fulfill a memory access request) until the time the memory page is subsequently deactivated (e.g., due to a different memory page being targeted).

Moreover, in some embodiments, a memory-aware controller may selectively determine whether to disable caching and/or pre-fetching of a candidate data block based at least in part on a current state of one or more memory arrays implemented in a memory sub-system. As described above, in some embodiments, a main memory controller, such as a DRAM memory controller, may be implemented and/or operated to control data storage in a memory array. Thus, at least in such embodiments, the main memory controller may determine a current state of the memory array and provide state information indicative of the current state of the memory array to the memory-aware controller, thereby enabling the memory-aware controller to selectively disabling caching and/or pre-fetching based at least in part on the current state of the memory array.

In some embodiments, state information associated with a memory array may identify the activation state of memory pages included in the memory array. In other words, in some embodiments, the state information may identify which memory page in the memory array is currently activated (e.g., open) and/or which one or more memory pages in the memory array are currently deactivated (e.g., closed). For example, the state information may indicate that a first memory page (e.g., row) in the memory array is currently in its activated (e.g., open) state and that a second (e.g., different) memory page in the memory array is currently in its deactivated (closed) state.

In other words, in some embodiments, state information associated with a memory array may include state information associated with one or more memory pages in the memory array. For example, the memory array state information may include first memory page state information indicative of a current state (e.g., activation state) of a first memory page in the memory array, second memory page state information indicative of a current state of a second memory page in the memory array, and so on. To facilitate indicating activation state, in some embodiments, state information may include one or more activation state parameters, which each indicates a current activation state of a corresponding memory page. For example, a first activation state parameter in the first memory page state information may be a "1-bit" (e.g., logic high bit) to indicate that the first memory page is currently in its activated (e.g., open) state and a second activation parameter in the second memory page state information may be a "0-bit" (e.g., logic low bit) to indicate that the second memory page is currently in its deactivated (e.g., closed) state.

As such, in some embodiments, a memory controller may update state information associated with a memory array each time a memory page in the memory array is activated or deactivated. To help illustrate, continuing with the above example, when the first memory page is subsequently deactivated, the memory controller may update the first activation state parameter to indicate that the first memory page is now in its deactivated state. Similarly, when the second memory page is subsequently activated, the memory controller may update the second activation state parameter to indicate that the second memory page is now in its activated state.

To facilitate associating state information with corresponding memory pages, in some embodiments, a memory sub-system may store the state information such that state information associated with each memory page is accessible using its row (e.g., page) address, for example, via a cache. As will be described in more detail below, to facilitate improving computing system operational efficiency, in some embodiments, a memory controller may selectively disable pre-fetching and/or caching of a candidate data block in a dedicated (e.g., actual) lower (e.g., cache and/or pre-fetch buffer) memory level based at least in part on state information associated with a currently activated memory page and/or state information associated with a memory page targeted by a memory access request currently being fulfilled. Accordingly, at least in such embodiments, the memory controller may determine (e.g., retrieve) state information associated with a memory page each time the memory page is targeted by a memory access request, for example, by using the row address of the memory page to load the associated state information from the cache into a register of the memory controller.

In addition to an activation state parameter, in some embodiments, state information associated with a memory page may include a page hit (e.g., row hit or subsequent target) confidence parameter, which indicates the confidence (e.g., statistical likelihood and/or statistical probability) that a subsequent (e.g., next successive) memory access request will target the memory page. In particular, in some embodiments, the value of a page hit confidence parameter associated with a memory page at the beginning of an activation period may be indicative of the number of times the memory page is expected to be successively be targeted during the activation period. Generally, when a memory page is expected to be targeted a larger number of times during an activation period, a memory controller may predict that a subsequent memory access request is more likely to target the memory page while it is already in its activated state (e.g., due to targeting by a directly previous memory access request) and, thus, more likely to result in a page (e.g., row buffer) hit. Conversely, when the memory page is expected be targeted a fewer number of times during the activation period, the memory controller may predict that the subsequent memory access request more likely to target the memory page while it is in its deactivated state (e.g., due to a directly previous memory access request targeting a different memory page) and, thus, more likely to result in a page (e.g., row buffer) miss. In other words, when the memory page is expected be targeted a fewer number of times during the activation period, the memory controller may predict that the subsequent memory access request less likely to target the memory page while it is in its activated state and, thus, less likely to result in a page hit.

In other words, based at least in part on the value of a page hit confidence parameter associated with an activated memory page, in some embodiments, a memory controller may determine (e.g., predict) the confidence (e.g., statistical likelihood and/or statistical probability) that a subsequent (e.g., next successive) memory access request will hit the activated memory page. Since memory access patterns are often somewhat cyclical (e.g., repetitive), in some embodiments, a memory controller may determine (e.g., update) the value of a page hit confidence parameter to be associated with a memory page based at least in part on the number of times the memory page previous resulted in a page hit, for example, during a recent series (e.g., sequence) of memory access request. In other words, when an activation period is ended due to the memory page being deactivated, the memory controller may update the state information associated with the memory page at least in part by updating the value of a page hit confidence parameter included in the state information based at least in part on the number of times the memory page was targeted during the activation period, for example, in addition to updating an activation state parameter included in the state information to indicate that memory page is now in its deactivated state.

To facilitate tracking the number of times a memory page is targeted, in some embodiments, a memory controller may include and/or utilize one or more counters. As an illustrative non-limiting example, in some embodiments, the memory controller may load a counter value associated with a memory page when the memory page is initially activated to fulfill a memory access request. Additionally, while the memory page remains activated, the memory controller may increment its associated counter value each time the memory page is subsequently targeted by a successive memory access request. On the other hand, when a subsequent memory access request targets a different (e.g., currently deactivated) memory page, the memory controller may update the counter value associated with the (e.g., current activated) memory page and update a page hit confidence parameter included in associated state information accordingly.

As another illustrative non-limiting example, in some embodiments, the memory controller may reset the value of a counter (e.g., to zero) when a memory page is initially activated to fulfill a (e.g., first) memory access request. Additionally, while the memory page remains activated, the memory controller may increment the value of the counter each time the memory page is subsequently targeted by a successive memory access request. To help illustrate, continuing with the above example, the memory controller may increment the counter from a value of zero to a value of one when the memory page is subsequently targeted by a second memory access request, from a value of one to a value of two when the memory page is subsequently targeted by a third memory access request, and so on.

On the other hand, when a memory page is deactivated at the end of an activation period, a memory controller may update a page hit confidence parameter included in associated state information based at least in part on the number of times the memory page was successively targeted during the activation period. In other words, continuing with the above example, when the memory page is subsequently deactivated, the memory controller may update the value of the associated page hit confidence parameter based at least in part on the counter value resulting at the end of the activation period, for example, before the counter is reset due to a next memory access request targeting and, thus, resulting in a different memory page being activated. As an illustrative example, in some embodiments, the memory controller may update the page hit confidence parameter by overwriting a previous value (e.g., determined at beginning of the activation period) with the counter value resulting at the end of the activation period.

Additionally or alternatively, a memory controller may update a page hit confidence parameter associated with a memory page based at least in part on one or more previous states of the memory page. For example, at the end of an activation period, the memory controller may update the page hit confidence parameter associated with the memory page based on an (e.g., weighted) average of the counter value resulting at the end of the activation period and the value of the page hit confidence parameter associated with the memory page at the beginning of the activation period, thereby producing a moving average. Additionally or alternatively, the memory controller may update the page hit confidence parameter by averaging the counter values resulting at the end of multiple activation periods, for example, such that counter values resulting at the end of more recent activation periods are weighted more heavily than counter values results at the end of older activation periods.

In any case, as described above, a memory controller may determine (e.g., retrieve) state information, which includes a page hit confidence parameter and an activation state parameter, associated with a memory page in response to the memory page being targeted by a memory access request. Additionally, as described above, in some embodiments, a memory access request received by a memory controller may be a pre-fetch (e.g., read) memory access request that targets a data block stored in a memory array (e.g., higher) memory level for pre-fetching to a dedicated (e.g., actual) lower (e.g., cache and/or pre-fetch buffer) memory level. As such, in response to receipt of a pre-fetch memory access request, the memory controller may determine state information associated with a target memory page at which the data block targeted for pre-fetching is currently stored.

Furthermore, as described above, in some embodiments, a memory access request received by a memory controller may be a demand memory access request. For example, the demand memory access request may be a read memory access request that demands (e.g., targets) return of a data block stored in a memory array (e.g., higher) memory level. Additionally or alternatively, the demand memory access request may be a write memory access request that demands storage of a data block in a memory array (e.g., higher) memory level. As such, in response to receipt of a demand memory access request, the memory controller may determine state information associated with a demanded (e.g., target) memory page in which a data block is targeted for storage and/or a demanded memory page in which a data block targeted for retrieval is currently stored.

Moreover, as described above, in some instances, a copy (e.g., instance) of a data block targeted by a demand memory access request may additionally be stored in a dedicated cache in an effort to improve computing system operational efficiency. However, as described above, storage capacity of a dedicated lower (e.g., pre-fetch buffer and/or cache) memory level is generally limited compared to a memory array (e.g., higher) memory level. Additionally, as described above, pre-charging and activating a memory page to enable writing to and/or reading from storage locations therein generally consumes electrical power. As such, at least in some instances, automatically pre-fetching and/or caching a data block in a dedicated lower (e.g., cache and/or pre-fetch buffer) memory level may actually reduce computing system operational efficiency, for example, due to the limited storage capacity resulting in another data block being prematurely evited from the dedicated lower memory level and/or activation of a memory page in which the data block is stored increasing power consumption.

Accordingly, to facilitate improving computing system operational efficiency, in some embodiments, a memory controller may selectively (e.g., predictively and/or adaptively) disable (e.g., block) pre-fetching and/or caching of a candidate data block in a dedicated lower (e.g., cache and/or pre-fetch buffer) memory level based at least in part on state information associated with a memory page that is currently in its activated state and/or that is currently being targeted to fulfill a memory access request. For example, based at least in part on the page hit confidence parameter associated with a memory page, the memory controller may determine (e.g., predict) the confidence (e.g., statistical likelihood and/or statistical probability) that a subsequent (e.g., next successive) memory access request will also target the memory page. Additionally, based at least in part on the activation state parameter associated with a memory page, the memory controller may determine whether the memory page is already (e.g., currently) in its activated state, for example, due to a (e.g., directly) previous memory access request targeting the same memory page.

In other words, based at least in part on state information determined in response to a memory access request, in some embodiments, a memory controller may determine whether a memory page targeted by the memory access request is currently in its activated state. As described above, in some embodiments, a memory controller may artificially treat a currently activated memory page as a lower (e.g., cache and/or pre-fetch buffer) memory level when pre-fetching and/or caching in a dedicated (e.g., actual) lower memory level is selectively disabled. In other words, when pre-fetching and/or caching in a dedicated lower memory level is selectively disabled in such embodiments, the memory controller may artificially treat the currently activated memory page in a memory array as a lower (e.g., row buffer) memory level compared to currently deactivated memory pages in the memory array, for example, such that the memory controller attempts to retrieve a demanded data block from the currently activated memory page before attempting to retrieve the demanded data block from the currently deactivated memory pages and/or from a dedicated (e.g., actual) lower memory level.

In fact, in some embodiments, the memory controller may utilize different decision criteria for determining whether to enable or disable pre-fetching and/or caching in a dedicated lower (e.g., cache and/or pre-fetch buffer) memory level depending on whether a target memory page is currently in its activated state or its deactivated state. For example, when a memory page in its activated state is targeted by a memory access request, the memory controller may determine that a subsequent (e.g., next successive) memory access request is less likely to target the same (e.g., currently activated) memory page when the value of a page hit confidence parameter associated with the memory request is less than a (e.g., first) confidence (e.g., statistical likelihood and/or statistical probability) threshold. In other words, in such instances, the memory controller may predict that the subsequent memory access request will target a different (e.g., currently deactivated) memory page and, thus, miss the (e.g., currently activated) memory page, thereby resulting in the memory page being in its deactivated state when access to the memory page is subsequently targeted (e.g., demanded). Accordingly, in such instances, the memory controller may enable pre-fetching and/or caching (e.g., disable cache bypass) of a candidate data block in a dedicated lower (e.g., pre-fetch buffer and/or cache) memory level, which, at least in some instances, may facilitate improving computing system operational efficiency, for example, by enabling the candidate data block, if subsequently demanded, to be supplied from the dedicated lower memory level instead of a memory page in a memory array (e.g., higher) memory level that is expected to be in its deactivated state.

Conversely, when a memory page in its activated memory page is targeted by a memory access request, the memory controller may determine that a subsequent (e.g., next successive) memory access request is more likely to target the same memory page when the value of an associated page hit confidence parameter is not less than the (e.g., first) confidence threshold. In other words, in such instances, the memory controller may predict that the subsequent memory access request will also target and, thus, hit the same (e.g., currently activated) memory page, thereby resulting in the memory page being in its activated state when access to the memory page is subsequently targeted (e.g., demanded). Accordingly, in such instances, the memory controller may disable pre-fetching and/or caching (e.g., enable cache bypass) of a candidate data block in the dedicated lower memory level, which, at least in some instances, may facilitate improving computing system operational efficiency, for example, by reducing likelihood the candidate data block polluting the dedicated lower memory level and instead enabling the candidate data block, if subsequently demanded, to be supplied from a memory page that is expected to be in its activated state.

On the other hand, when a target memory page is currently in its deactivated state, in some embodiments, a memory controller may automatically enable pre-fetching and/or caching of a candidate data block in a dedicated lower (e.g., cache and/or pre-fetch buffer) memory level. In other embodiments, a memory controller may nevertheless selectively disable pre-fetching and/or caching of a candidate data block in a dedicated lower memory level when a target memory page is currently in its deactivated state. For example, when a memory page in its deactivated state is targeted by a memory access request, the memory controller may determine that a subsequent memory access request is more likely to target a currently activated (e.g., different) memory page when the value of a page hit confidence parameter associated with the currently activated memory page is greater than a second confidence threshold. In other words, in such instances, the memory controller may predict that the subsequent memory access request will target a different (e.g., currently activated) memory page and, thus, miss the (e.g., currently deactivated) memory page targeted by the memory access request, thereby resulting in the memory page being in its deactivated state when access to the memory page is subsequently targeted (e.g., demanded). Accordingly, in such instances, the memory controller may disable pre-fetching and/or caching (e.g., disable cache bypass) of a candidate data block in the dedicated lower memory level, which, at least in some instances, may facilitate improving computing system operational efficiency, for example, by reducing likelihood of the candidate data block polluting the dedicated lower memory level and/or obviating power consumption resulting from activating the target memory page and subsequently re-activating the currently activated memory page.

Conversely, when a memory page in its deactivated state is targeted by a memory access request, the memory controller may determine that a subsequent (e.g., next successive) memory access request is less likely to target a currently activated (e.g., different) memory page when the value of a page hit confidence parameter associated with the currently activated memory page is not greater than the second confidence threshold. In other words, in such instances, the memory controller may predict that the subsequent memory access request will target a (e.g., currently deactivated) memory page different from the currently activated memory page. However, since a memory array may concurrently include multiple deactivated memory pages, at least in some instances, such a determination may have limited relevance to whether the (e.g., currently deactivated) memory page targeted by the memory access request will be in its activated state or its deactivated state when access to the memory page is subsequently targeted. Accordingly, in such instances, the memory controller may enable pre-fetching and/or caching (e.g., enable cache bypass) of a candidate data block in the dedicated lower memory level, which, at least in some instances, may facilitate improving computing system operational efficiency, for example, by enabling the candidate data block, if subsequently targeted, to be supplied from the cache instead of the memory array.

In some embodiments, the value of the second confidence threshold, which is used when a target memory page is currently in its deactivated state, may match the value of the first confidence threshold, which is used when the target memory page is currently in its activated state. In other embodiments, the value of the second confidence threshold and the value of the first confidence threshold may differ. For example, the value of the second confidence threshold may be greater than the value of the first confidence threshold or vice versa.

Moreover, in some embodiments, the value of a (e.g., first or second) confidence threshold used to determine whether to disable pre-fetching and the value of a corresponding confidence threshold used to determine whether to determine disable caching may differ. For example, when a target memory page is in its activated state, a memory controller may determine whether to disable pre-fetching based on a (e.g., first) pre-fetch confidence threshold and determine whether to disable caching based on a (e.g., first) cache confidence threshold. Additionally or alternatively, when a target memory page is in its deactivated state, a memory controller may determine whether to disable pre-fetching based on a second pre-fetch confidence threshold and determine whether to disable caching based on a second cache confidence threshold. In any case, as will be described in more detail below, implementing and/or operating a memory sub-system to selectively disable pre-fetching and/or caching in a dedicated lower (e.g., pre-fetch buffer and/or cache) memory level in this manner may facilitate improving operational efficiency of the memory sub-system and, thus, a computing system in which the memory sub-system is deployed.

To help illustrate, an example of a computing system 10 (e.g., apparatus), which includes a processing sub-system 12 (e.g., system) and a memory sub-system 14 (e.g., system), is shown in FIG. 1. It should be appreciated that the depicted example is merely intended to be illustrative and not limiting. In particular, the computing system 10 may additionally or alternatively include other computing sub-systems. For example, the computing system 10 may additionally include a networking sub-system, a radio frequency sub-system, a user input sub-system, and/or a display sub-system.

Moreover, in some embodiments, the computing system 10 may be implemented in a single electronic device, such as a desktop computer, a workstation computer, a laptop computer, a server, a mobile phone, a virtual-reality headset, and/or the like. In other embodiments, the computing system 10 may be distributed between multiple electronic devices. For example, the processing sub-system 12 and the memory sub-system 14 may be implemented in a host device while other computing sub-systems, such as the user input sub-system and/or the display sub-system, may be implemented in a client (e.g., remote) device. In fact, in some embodiments, a computing sub-system may be distributed between multiple electronic devices. For example, a first portion of the processing sub-system 12 and/or a first portion of the memory sub-system 14 may be implemented in a host device while a second portion of the processing sub-system 12 and/or a second portion of the memory sub-system 14 may be implemented in a client device.

In any case, during operation of the computing system 10, the processing sub-system 12 generally performs various operations, for example, to determine output data by executing instructions in a processor to perform a corresponding data processing operation on input data. Thus, as in the depicted example, the processing sub-system 12 may include processing circuitry 16. In some embodiments, the processing circuitry 16 may be included in one or more central processing units (CPUs), one or more graphics processing units (GPUs), one or more processor cores, or any combination thereof.

Additionally, as in the depicted example, the processing sub-system 12 may include one or more registers 22. In some embodiments, a register 22 may provide one or more storage locations directly accessible to the processing circuitry 16. However, storage capacity of the registers 22 is generally limited. Thus, as in the depicted example, the processing sub-system 12 may be communicatively coupled to the memory sub-system 14, which provides additional data storage capacity, via one or more communication buses 20. In some embodiments, a communication bus 20 may include one or more cables, one or more wires, one or more conductive traces, one or more communication networks, or any combination thereof.

In other words, the processing sub-system 12 and the memory sub-system 14 may communicate via the one or more communication buses 20. For example, the processing sub-system 12 may communicate (e.g., output or transmit) a write memory access request along with data for storage in the memory sub-system 14 and/or a read memory access request targeting return of data previously stored in the memory sub-system 14. Additionally or alternatively, the memory sub-system 14 may communicate (e.g., output or return) target data previously storage therein, for example, in response to a read memory access request to enable processing and/or execution by the processing circuitry 16 of the processing sub-system 12.

To provide data storage, as in the depicted example, the memory sub-system 14 may include one or more memory devices 18 (e.g., chips or integrated circuits). As will be described in more detail below, in some embodiments, the memory devices 18 may include memory cells (e.g., circuitry) organized into one or more memory arrays 28 and, thus, may include one or more tangible, non-transitory, computer-readable media. For example, the memory sub-system 14 may include one or more memory device 18 communicatively coupled to the processing sub-system 12 via an external communication (e.g., memory) bus 20.

However, as described above, data communication via an external communication bus 20 is generally slower than data communication within a processor-side of the external communication bus 20 and/or data communication within a memory-side of the external communication bus 20. At least in some instances, the difference in communication speed and, thus, resulting data retrieval latency may be due at least in part to the external communication bus 20 being shared with other computing sub-systems, timing differences between components on the processor-side of the external communication bus 20 and components on the memory-side of the external communication bus 20, and/or communication distance between the processor-side of the external communication bus 20 and the memory-side of the external communication bus 20.

To facilitate improving provided data access speed, as in the depicted example, the memory sub-system 14 may include one or more caches 24, which provide faster data access speeds compared to the memory devices 18. In some embodiments, a cache 24 may provide storage locations organized into one or more cache lines 30, for example, to store an instance (e.g., copy) of data also stored in a memory array 28 implemented in one or more memory devices 18. Accordingly, in some embodiments, a cache 24 may be communicatively coupled between a memory device 18 and the processing circuitry 16 of the processing sub-system 12 and/or used to implement a lower memory layer compared to a memory array 28 implemented in the memory device 18.

For example, the memory sub-system 14 may include one or more processor-side caches 24 implemented on a processor-side of an external communication (e.g., memory) bus 20. In some embodiments, one or more of the processor-side caches 24 may be integrated with the processing circuitry 16. For example, the processor-side caches 24 may include a level one (L1) cache, a level two (L2) cache, and/or a level three (L3) cache. Additionally or alternatively, the memory sub-system 14 may include one or more memory-side caches 24 implemented on a memory-side of the external communication bus 20. In other words, in some embodiments, a memory sub-system 14 may include a first (e.g., processor-side) portion implemented on a processor-side of external communication bus 20 and a second (e.g., memory-side) portion implemented on a memory-side of the external communication bus 20.

In some embodiments, the computing system 10 may additionally include one or more pre-fetch buffers 32, which provide faster data access speeds compared to the memory devices 18. For example, a processor-side of the memory sub-system 14 may include a processor-side pre-fetch buffer 32 distinct (e.g., separate) from its processor-side caches 24. Additionally or alternatively, the memory-side of the memory sub-system 14 may a memory-side pre-fetch buffer 32 distinct (e.g., separate) from its memory-side caches 24.

Furthermore, in some embodiments, a pre-fetch buffer 32 may provide storage locations organized into one or more buffer lines 33, for example, to store an instance (e.g., copy) of data pre-fetched (e.g., retrieved before demanded) from a memory array 28 implemented in one or more memory devices 18. Accordingly, in some embodiments, a pre-fetch buffer 32 may be communicatively coupled between a memory device 18 and the processing circuitry 16 of the processing sub-system 12 and/or used to implement a lower memory level compared to a memory array 28 implemented in the memory device 18. Moreover, in some embodiments, data pre-fetched to a pre-fetch buffer 32 may subsequently be transferred to a cache 24. Thus, at least in such embodiments, the pre-fetch buffer 32 may be communicatively coupled between the cache 24 and a memory device 18 and/or used to implement a higher memory level compared to the cache 24. In other embodiments, pre-fetched data may be directly stored into a cache 24 and, thus, the pre-fetch buffer 32 may be obviated (e.g., optional) and not included in the computing system 10.

In any case, to facilitate controlling data storage therein, the memory sub-system 14 may include one or more memory controllers (e.g., control logic and/or control circuitry) 34, for example, communicatively coupled to the caches 24, the pre-fetch buffers 32, and/or the memory devices 18 via a (e.g., instruction) communication bus 20. As in the depicted example, in some embodiments, a memory controller 34 may be implemented using multiple controllers (e.g., control logic and/or control circuitry), such as a cache controller 36, a pre-fetch controller 38, a main memory controller 40, and/or a memory-aware controller 42. In some embodiments, a cache controller 36 may be implemented and/or operated to control data storage in one or more caches 24 and, thus, corresponding cache (e.g., lower) memory levels implemented in the memory sub-system 14, for example, by identifying one or more candidate data blocks to be considered for storage (e.g., caching) in a cache memory level in addition to being stored in a higher (e.g., memory array) memory level. Additionally, in some embodiments, a pre-fetch controller 38 may be implemented and/or operated to facilitate predictively controlling data storage in one or more caches 24 and/or in one or more pre-fetch buffers 32 and, thus, corresponding lower memory levels implemented in the memory sub-system 14, for example, by identifying one or more candidate data blocks to be considered for pre-fetching from a higher (e.g., memory array) memory level into a dedicated lower (e.g., pre-fetch buffer and/or cache) memory level.

Furthermore, in some embodiments, a main memory controller 40, such as a DRAM memory controller, may be implemented and/or operated to control data storage in one or more memory arrays 28 implemented in the memory sub-system 14. In particular, in some embodiments, a (e.g., main) memory controller 34 may control operation of a memory array 28 in accordance with an open page policy, for example, such that a currently activated memory page remains activated until a different (e.g., currently deactivated) memory page is targeted at which point the currently activated memory page is deactivated and the different memory page is subsequently activated. In other words, at least in such embodiments, an activation period of a memory page may span from the time the memory page is initially activated (e.g., to fulfill a memory access request) until the time the memory page is subsequently deactivated (e.g., due to a different memory page being targeted).

Moreover, to facilitate improving operational efficiency of the computing system 10, in some embodiments, a memory-aware controller 42 may selectively (e.g., predictively and/or adaptively) determine whether to disable pre-fetching and/or caching of a candidate data block in a dedicated lower (e.g., pre-fetch buffer and/or cache) memory level based at least in part on a current state of one or more memory arrays 28 implemented in the memory sub-system 14. As described above, in some embodiments, a main memory controller 40, such as a DRAM memory controller, may be implemented and/or operated to control data storage in a memory array 28. Thus, at least in such embodiments, the main memory controller 40 may determine a current state of the memory array 28 and provide state information indicative of the current state of the memory array 28 to the memory-aware controller 42, thereby enabling the memory-aware controller 42 to selectively disabling caching and/or pre-fetching based at least in part on the current state of the memory array 28.

Additionally, as described above, in some embodiments, a memory sub-system 14 may include a processor-side portion and a memory-side portion coupled via an external communication (e.g., memory) bus 20. Thus, in some embodiments, the memory sub-system 14 may include one or more memory controllers 34 implemented on a memory-side of the external communication bus 20, for example, as a memory-side memory controller 34. Additionally or alternatively, the memory sub-system 14 may include one or more memory controller 34 implemented on a processor-side of the external communication bus 20, for example, as a processor-side memory controller 34.

Figure 2:
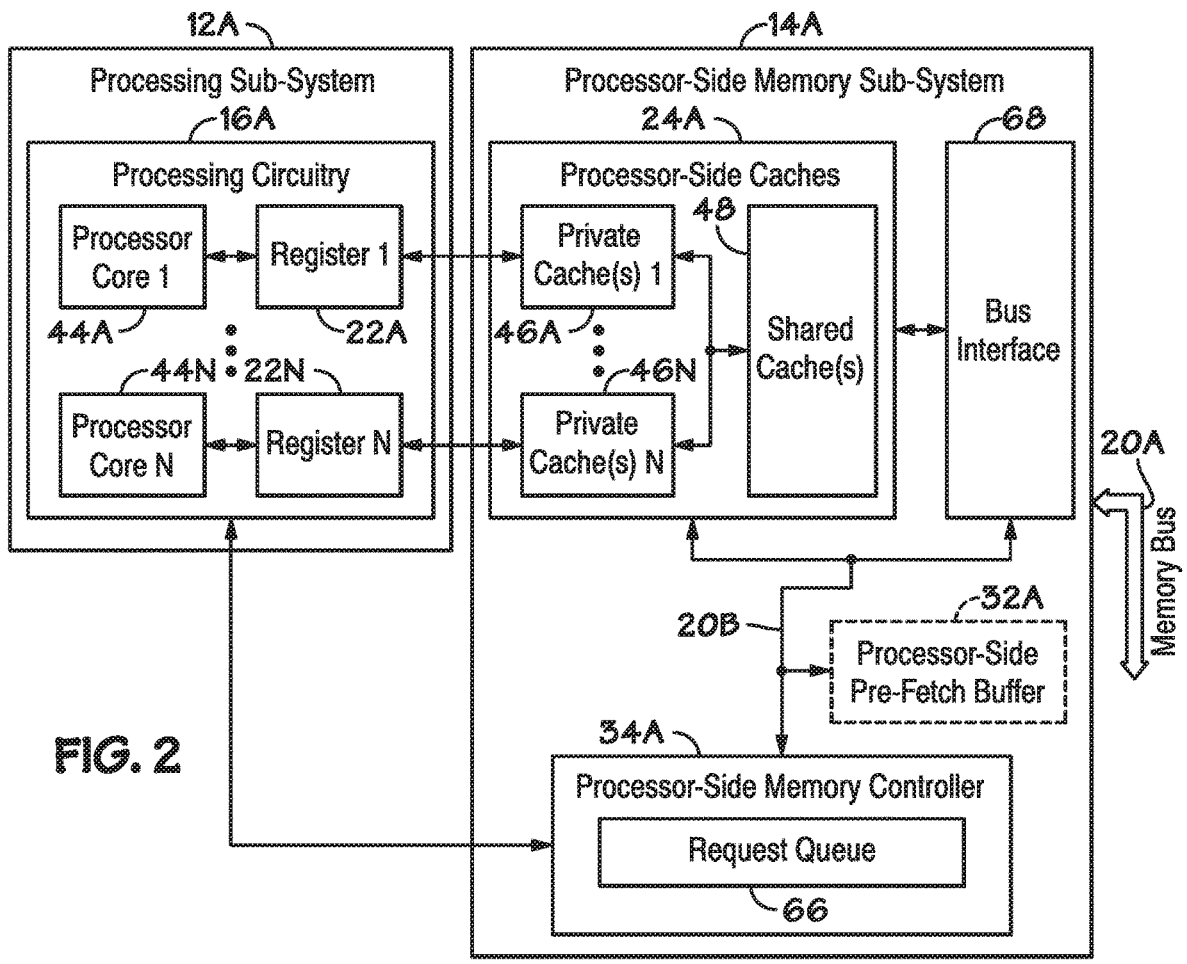
FIG. 2 is a block diagram of an example of the processing sub-system of FIG. 1 and a processor-side of the memory sub-system of FIG. 1, in accordance with an embodiment of the present disclosure.

To help illustrate, an example of a processor-side of a computing system 10, which includes a processing sub-system 12A and a processor-side memory sub-system 14A, is shown in FIG. 2. As described above, in some embodiments, processing circuitry 16 of a processing sub-system 12 may be implemented using one or more processor cores 44. For example, the processing circuitry 16A in the processing sub-system 12A may include at least a first processor core 44A and an Nth processor core 44N. However, it should be appreciated that the depicted example is merely intended to be illustrative and not limiting. For example, in other embodiments, a processing sub-system 12 may include a single processor core 44 or two or more (e.g., four, eight, or sixteen) processor cores 44.

Additionally, as described above, in some embodiments, a processing sub-system 12 may include one or more registers 22 that provide storage locations directly accessible to its processing circuitry 16. For example, the processing sub-system 12A may include at least a first register 22A, which may provide a storage location directly accessible to the first processor core 44A, and an Nth register 22N, which may provide a storage location directly accessible to the Nth processor core 44N. To facilitate increasing storage provided on the processor-side of a memory bus 20A, as described above, a processor-side memory sub-system 14A may include one or more processor-side caches 24A and/or a processor-side pre-fetch buffer 32A. In some embodiments, a processor-side cache 24A and/or the processor-side pre-fetch buffer 32A may be implemented using volatile memory, such as static random-access memory (SRAM) and/or dynamic random-access memory (DRAM).

Furthermore, in some embodiments, the processor-side caches 24A may be organized to implement one or more hierarchical (e.g., cache) memory levels. For example, the processor-side caches 24A may include private processor-side caches 46, which may be used to implement one or more lower (e.g., lowest) memory levels, and a shared processor-side cache 48, which may be used to implement a higher (e.g., intermediate) memory level. In some embodiments, the data storage provided by the shared processor-side cache 48 may be shared by at least the first processor core 44A and the Nth processor core 44N. For example, the shared processor-side cache 48 may include one or more level three (L3) processor-side caches 24A.

On the other hand, in some embodiments, the data storage provided by a private processor-side cache 46 may be dedicated to a corresponding processor core 44. For example, a first one or more private processor-side caches 46A may include a level one (L1) processor-side cache 24A dedicated to the first processor core 44A and a level two (L2) processor-side cache 24A cache dedicated to the first processor core 44A. Additionally or alternatively, an Nth one or more private processor-side caches 46N may include a level one (L1) processor-side cache 24A dedicated to the Nth processor core 44N and a level two (L2) processor-side cache 24A dedicated to the Nth processor core 44N.

In any case, a processor-side memory controller 34A may generally control data storage in the processor-side memory sub-system 14A. In other words, in some embodiments, the processor-side memory controller 34A may control data storage in the processor-side caches 24A, the processor-side pre-fetch buffer 32A, and/or the registers 22 implemented in the processing sub-system 12A. For example, the processor-side memory controller 34A may control data storage such that data demanded (e.g., targeted) by the processing circuitry 16A is returned to one or more of its registers 22. Thus, as in the depicted example, the processor-side memory controller 34A may be communicatively coupled to the processing circuitry 16A, the processor-side caches 24A, and/or the processor-side pre-fetch buffer 32A via one or more processor-side internal buses 20B, for example, to enable the processor-side memory controller 34A to determine data demanded (e.g., targeted) by the processing circuitry 16A and/or to output control (e.g., command) signals that instruct (e.g., cause) the processor-side memory sub-system 14A to adjust data storage therein.

In particular, in some embodiments, the processor-side memory controller 34A may identify a target data block, for example, which is demanded for storage (e.g., writing) in the memory sub-system 14 by the processing sub-system 12A, demanded for retrieval (e.g., reading) from the memory sub-system 14 by the processing sub-system 12A, and/or expected (e.g., predicted) to be demanded by the processing sub-system 12A during an upcoming control horizon (e.g., time period and/or one or more clock cycles). Additionally, the processor-side memory controller 34 may determine whether the target data block is currently stored in the processor-side memory sub-system 14A and, thus, whether the target data block results in a processor-side miss. Moreover, as described above, in some embodiments, a processor-side memory sub-system 14A may provide data storage via one or more dedicated lower memory levels, for example, implemented using one or more processor-side caches 24 and/or a processor-side pre-fetch buffer 32A.

Figure 3:
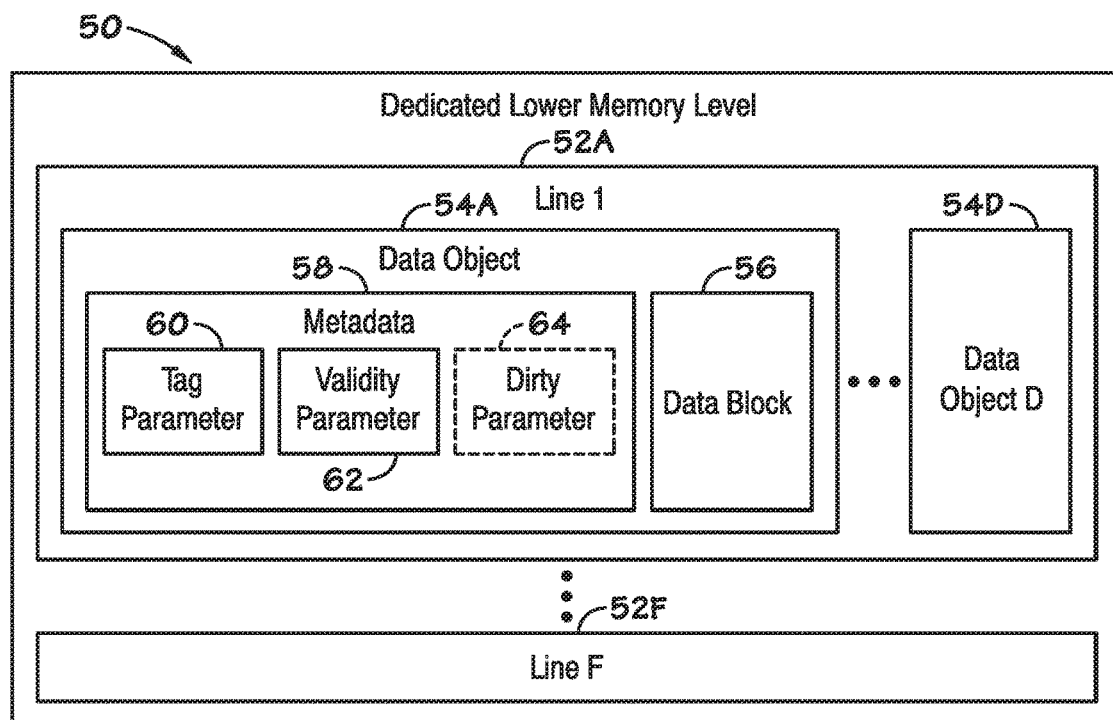
FIG. 3 is a block diagram of an example of a dedicated lower (e.g., cache and/or pre-fetch buffer) memory level implemented in the computing system of FIG. 1, in accordance with an embodiment of the present disclosure.

To help illustrate, an example of a dedicated lower (e.g., cache and/or pre-fetch buffer) memory level 50, which may be implemented in a memory sub-system 14, is shown in FIG. 3. In some embodiments, the dedicated lower memory level 50 may be a cache memory level and, thus, implemented using one or more caches 24. Additionally or alternatively, the dedicated lower memory level 50 may be a pre-fetch buffer memory level and, thus, implemented using one or more pre-fetch buffers 32.

In any case, as in the depicted example, the dedicated lower memory level 50 may provide storage locations organized into multiple lines 52 (e.g., cache lines 30 and/or buffer lines 33)—namely a first line 52A, an Fth line 52F, and so on. Additionally, as in the depicted example, storage locations included in a line 52 of the dedicated lower memory level 50 may be allocated to enable storage of one or more data objects 54, which each includes a data block 56 and associated metadata 58. For example, the first line 52 may be implemented with a line width that enables storage of D valid data objects 54 including at least a first data object 54A and a Dth data object 54D. However, it should be appreciated that the depicted example is merely intended to be illustrative and not limiting. For example, in other embodiments, a line 52 in a dedicated lower (e.g., cache and/or pre-fetch buffer) memory level 50 may be allocated with a line width that enables storage of a single valid data object 54, a single valid data block 56, more than two valid data objects 54, or more than two valid data blocks 56.

In any case, a data block 56 generally includes related data bits, for example, which are expected to be processed (e.g., analyzed and/or interpreted) together. Additionally, as in the depicted example, metadata 58 in a data object 54 may include one or more parameters associated with a corresponding data block 56 in the data object 54. For example, the metadata 58 may include a tag parameter 60, a validity parameter 62, and/or a dirty parameter 64. However, it should again be appreciated that the depicted example is merely intended to be illustrative and not limiting. For example, in other embodiments, metadata 58 in a data object 54 may include one or more other parameters, such as a transaction context parameter, associated with a corresponding data block 56 in the data object 54

In some embodiments, a validity parameter 62 included in metadata 58 of a data object 54 may indicate the validity of a corresponding data block 56. For example, the validity parameter 62 may include a validity bit, which indicates that the data block 56 is valid when set (e.g., "1" bit or high) and invalid when not set (e.g., "0" bit or low). Additionally or alternatively, the validity parameter 62 may facilitate detecting whether the data block 56 is valid and/or correcting the data block 56 when invalid. For example, the validity parameter 62 may include one or more error checking codes, such as an inversion bit, a poison bit, a parity bit, an error-detecting code (EDC), an error-correcting code (ECC), a Bose-Chaudhuri-Hocquenghem (BCH) code, a message authentication code (MAC), a cyclic redundancy check (CRC) code, or any combination thereof.

Additionally, in some embodiments, a dirty parameter 64 included in metadata 58 of a data object 54 may indicate whether a corresponding data block 56 has been modified relative to a version of the data block 56 stored in a higher memory level. For example, the dirty parameter 64 may include a dirty bit, which indicates that the data block 56 has been modified when set (e.g., "1" bit or high) and that the data block 56 has not been modified when not set (e.g., "0" bit or low). In other words, at least in such embodiments, the dirty parameter 64 may be toggled when the data block 56 is initially modified relative to a version of the data block 56 stored in a higher memory level.

Furthermore, in some embodiments, a tag parameter 60 included in metadata 58 of a data object 54 may facilitate identifying a corresponding data block 56. In some embodiments, the value of an associated tag parameter 60 may be indicative of the storage location of the data block 56 and/or a corresponding data object 54 in an address space and, thus, may be used to identify the data block 56 and/or the data object 54. In other words, in some embodiments, the tag parameter 60 may indicate a virtual memory address of the data block 56, a physical memory address of the data block 56, or a value determined based on the virtual memory address and the physical memory address of the data block 56.

As such, in some embodiments, a memory sub-system 14 may search for a target (e.g., requested and/or demanded) data block 56 in a dedicated lower (e.g., cache and/or pre-fetch buffer) memory level 50 based at least in part on the value of tag parameters 60 associated with valid data blocks 56 stored therein. For example, returning to the processor-side memory sub-system 14A of FIG. 2, when a data block 56 is targeted, the processor-side memory controller 34A may determine a target value of a tag parameter 60 expected to be associated with the target data block 56.

In particular, in some embodiments, the processor-side memory controller 34A may determine the target value of the tag parameter 60 based at least in part on a virtual memory address and/or a physical memory address associated with the target data block 56.

Based at least in part on the target value, the processor-side memory controller 34A may determine whether the target data block 56 misses a dedicated lower memory level 50 implemented in the processor-side memory sub-system 14A by searching tag parameters 60 associated with valid data blocks 56 stored in the dedicated lower memory level 50. For example, the processor-side memory controller 34A may determine that the target data block 56 is stored in a dedicated lower memory level 50 when the target tag parameter 60 matches the tag parameter 60 associated with a valid data block 56 stored therein and, thus, results in a lower memory level (e.g., cache and/or pre-fetch buffer) hit. On the other hand, the processor-side memory controller 34A may determine that the target data block 56 is not stored in the dedicated lower memory level 50 when the target tag parameter 60 does not match tag parameters 60 associated with any valid data block 56 stored therein and, thus, results in a lower memory level (e.g., cache and/or pre-fetch buffer) miss.

When a data block 56 targeted for retrieval is not stored in any of the one or more dedicated lower memory levels 50 implemented in the processor-side memory sub-system 14A, the processor-side memory controller 34A may determine that the target data block 56 results in a processor-side miss. As described above, when a target data block 56 results in a processor-side miss, the processor-side memory sub-system 14A may output a read (e.g., pre-fetch or demand) memory access request, which requests return of the target data block 56, via the memory bus 20A. Additionally or alternatively, the processor-side memory sub-system 14A may output a write (e.g., demand) memory access request, which requests storage of a target data block 56, via the memory bus 20A.

As in the depicted example, in some embodiments, a processor-side memory sub-system 14A may include a request (e.g., command) queue 66, which may be used to store memory access requests before output to the memory bus 20A. In other words, at least in such embodiments, the processor-side memory controller 34A may generate a memory access request and store the memory access request in the request queue 66. The processor-side memory sub-system 14A may then retrieve the memory access request from the request queue 66 and output the memory access request to the memory bus 20A. In fact, in some embodiments, the processor-side memory controller 34A may generate memory access requests with varying fulfillment priorities, for example, such that demand memory access requests have higher fulfillment priorities compared to pre-fetch memory access requests.

To enable communication via the memory bus 20A, as in the depicted example, the processor-side memory sub-system 14A may include a processor-side bus interface 68 coupled between the memory bus 20A and the one or more processor-side internal buses 20B. In some embodiments, the processor-side bus interface 68 may include one or more pins, which may each be coupled to corresponding wire of the memory bus 20A. Additionally, as described above, a memory-side of a memory sub-system 14 may be couple to an opposite end of memory bus 20A.

Figure 4:
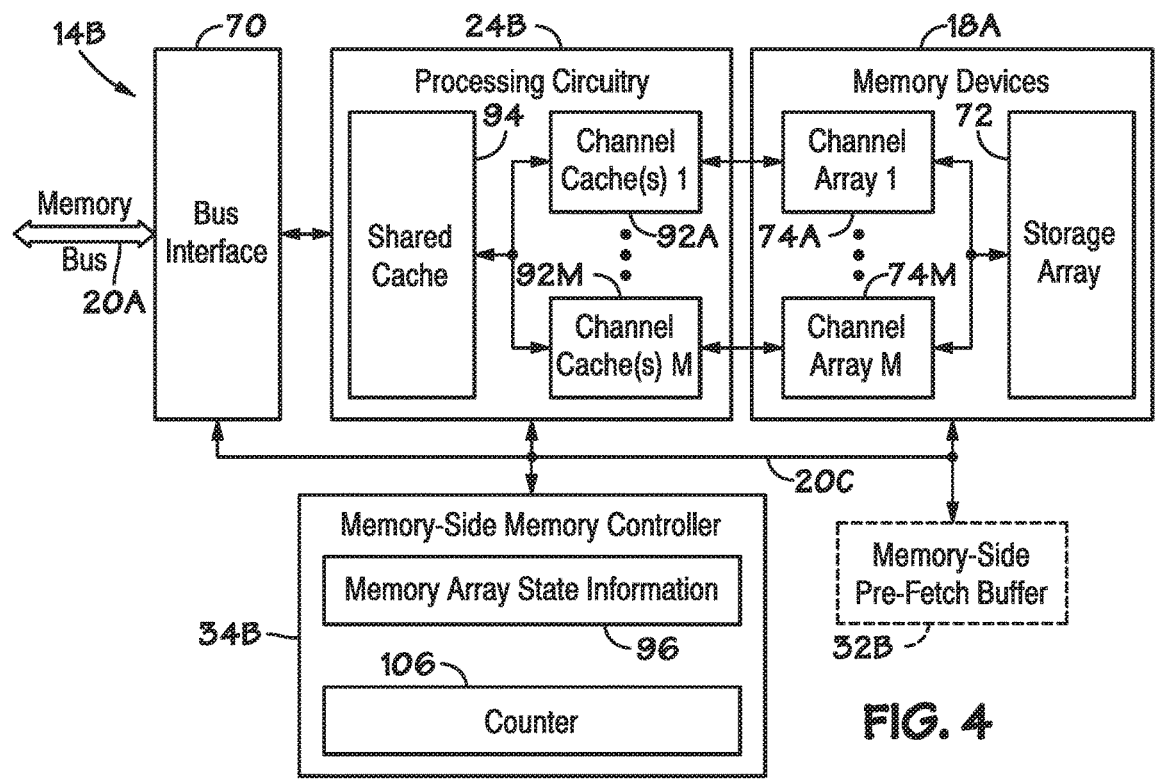
FIG. 4 is a block diagram of an example of a memory-side of the memory sub-system of FIG. 1, in accordance with an embodiment of the present disclosure.

To help illustrate, an example of a memory-side memory sub-system 14B, which is coupled to a memory bus 20A via a memory-side bus interface 70, is shown in FIG. 4. In some embodiments, the memory-side bus interface 70 may include one or more pins, which may each be coupled to corresponding wire of the memory bus 20A. Additionally, as in the depicted example, the memory-side memory sub-system 14B may include one or more memory-side caches 24B, a memory-side pre-fetch buffer 32B, and one or more memory devices 18A. However, it should be appreciated that the depicted example is merely intended to be illustrative and not limiting. For example, in other embodiments, the memory-side caches 24 and/or the memory-side pre-fetch buffer 31 may be optional and, thus, not included in a memory sub-system 14.

In any case, as described above, in some embodiments, a memory sub-system 14 may include one or more non-volatile memory devices 18 and/or one or more volatile memory devices 18. Generally, a non-volatile memory device 18 may provide data storage using non-volatile memory. For example, a non-volatile memory device 18 may include a flash (e.g., NAND) memory device, a phase-change memory (e.g., 3D XPoint™) device, a ferroelectric random access memory (FeRAM) device, a solid state drive (SSD), a hard disk drive (HDD), or any combination thereof. On the other hand, a volatile memory device 18 may generally provide data storage using volatile memory. For example, a volatile memory device 18 may include a dynamic random-access memory (DRAM) device, a static random-access memory (SRAM) devices, or both.

Furthermore, in some embodiments, multiple memory devices 18 may be implemented on a memory module, such as a dual in-line memory module (DIMM) or a single in-line memory module (SIMM). For example, a memory module may include a printed circuit board (PCB) and multiple memory devices 18 disposed on a flat or planar (e.g., front or back) surface of the printed circuit board. Additionally, the memory devices 18 may be coupled to external pins formed along an (e.g., bottom) edge of the printed circuit board via conductive traces formed on the printed circuit board.

However, it should be appreciated that one or more of the memory devices 18 may be implemented using other packing techniques. For example, memory devices 18 may be coupled to a (e.g., silicon) interposer to implement a 2.5D configuration. Additionally or alternatively, memory devices 18 may be stacked to implement a 3D configuration. Furthermore, in some embodiments, memory devices 18 may be implemented using organic packaging techniques. In other words, in some embodiments, the techniques described in the present disclosure may be implemented as an on-package solution.

In any case, as described above, different memory types generally provide varying tradeoffs that affect operational efficiency and/or implementation associated cost, such as component count, manufacturing steps, and/or physical footprint, of a memory sub-system 14 and, thus, a computing system 10 in which the memory sub-system 14 is deployed. For example, non-volatile memory generally provides higher (e.g., greater) data storage density compared to volatile memory. Additionally, non-volatile memory cells, in contrast to volatile memory cells, may maintain storage of data even while in an unpowered state. On the other hand, volatile memory generally provides faster data access (e.g., read and/or write) speeds compared to non-volatile memory. In fact, static random-access memory (SRAM) generally provide faster data access speeds compared to dynamic random-access memory (DRAM).

Thus, to facilitate improving data access speeds, in some embodiments, a volatile memory device 18 may be used to implement a lower (e.g., smaller and faster) memory level compared to a non-volatile memory device 18, for example, which implements a highest (e.g., largest and slowest) memory level. As described above, in some embodiments, memory cells in one or more memory devices 18 may be organized into a memory array 28 to implement a corresponding memory level. For example, non-volatile memory cells in the memory-side memory sub-system 14B may be organized into a storage memory array 72 corresponding with a storage (e.g., highest and/or non-volatile) memory level in the memory sub-system 14.

Additionally, in some embodiments, volatile memory cells may be organized into one or more memory channel memory arrays 74, for example, each corresponding with a different memory (e.g., DRAM) channel. As an illustrative example, volatile memory cells in the memory-side memory sub-system 14B may be organized into a first memory channel memory array 74A corresponding with a first memory channel. Additionally or alternatively, volatile memory cells in the memory-side memory sub-system 14B may be organized into an Mth memory channel memory array 74M corresponding with an Mth memory channel.

Figure 5:
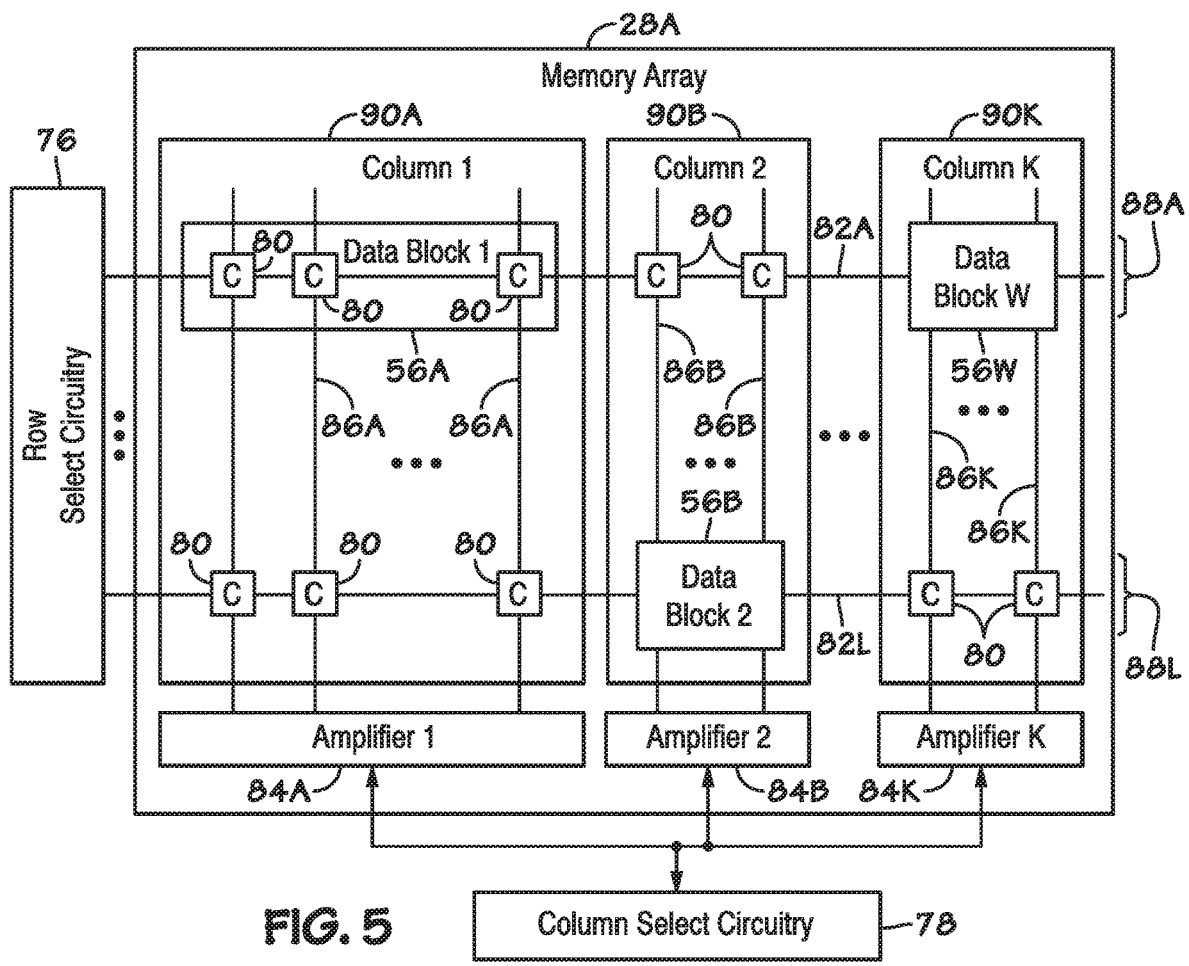
FIG. 5 is a block diagram of an example memory array implemented in the memory sub-system of FIG. 4, in accordance with an embodiment of the present disclosure.

An example of a memory array 28A, which may be implemented in one or more memory devices 18, is shown in FIG. 5. As in the depicted example, the memory array 28A may be coupled to control circuitry—namely row select (e.g., decoder) circuitry 76 and column select (e.g., decoder) circuitry 78. Additionally, as in the depicted example, the memory array 28A may include memory cells 80 coupled to the row select circuitry 76 via word lines 82 formed in a first (e.g., horizontal) direction and to amplifier circuitry 84 via bit lines 86 formed in a second (e.g., vertical) direction.

In some embodiments, each memory cell 80 may include a switching component, such as a metal-oxide-semiconductor field-effect transistor (MOSFET), and a storage component, such as a capacitor. For example, a memory cell 80 may be implemented such that its MOSFET is coupled between a bit line 86 and its storage capacitor and the gate of its MOSFET is coupled to a word line 82. As such, in some embodiments, each memory cell 80 may be used to store one bit of data. For example, a memory cell 80 may indicate a 1-bit (e.g., logic high bit) when charge stored in the memory cell 80 results in a voltage greater than a threshold voltage. On the other hand, the memory cell 80 may indicate a 0-bit (e.g., logic low bit) when charge stored in the memory cell 80 results in a voltage less than the threshold voltage. In other embodiments, a memory cell 80 may be implemented to store multiple bits of data. For example, a memory cell 80 in Quad-Level Cell (QLC) NAND memory may be implemented to store two bits of data.

In any case, as in the depicted example, the memory cells 80 may be organized into one or more memory cell rows 88 (e.g., memory pages), which may each be identified by a corresponding row (e.g., page) address, and one or more memory cell columns 90, which may each be identified by a corresponding column (e.g., physical memory) address. In some embodiments, a memory cell row 88 may include each of the memory cells 80 coupled to a (e.g., one) word line 82. For example, a first memory cell row 88A (e.g., first memory page) may include each of the memory cells 80 coupled to a first word line 82A and an Lth memory cell row 88L (e.g., Lth memory cell page) may include each of the memory cells 80 coupled to an Lth word line 82L.

As in the depicted example, organizing the memory array 28A in this manner may enable memory cells 80 to be grouped into storage locations (e.g., memory addresses) each suitable for storage of a data block 56. For example, a first data block 56A may be stored at a first storage location including the memory cells 80 in the first memory cell row 88A and a first memory cell column 90A, a second data block 56B may be stored at a second storage location including the memory cells 80 in the Lth memory cell row 88L and a second memory cell column 90B, and a Wth data block 56W may be stored at a Wth storage location including the memory cells 80 in the first memory cell row 88A and the Kth memory cell column 90K. In other embodiments, the memory cells 80 in a memory array 28 to be grouped into storage locations each suitable for storage of a data object 54, which includes a data block 56 and corresponding metadata 58.

In any case, as described above, row select circuitry 76 may be connected to memory cell row 88 (e.g., memory pages) of the memory array 28A via corresponding word lines 82. To enable reading from and/or writing to storage locations in a specific memory page, the row select circuitry 76 may activate the memory cells 80 included in the memory page. For example, in some embodiments, the row select circuitry 76 may pre-charge a memory page (e.g., memory cell row 88) by outputting a pre-charge control signal via a corresponding word line 82 and, subsequently, activate the memory page by outputting an activation (e.g., logic high) control signal via the corresponding word line 82, which causes the switching component of each memory cell 80 in the memory page to electrically couple (e.g., connect) its storage component to a corresponding bit line 86.

Moreover, as in the depicted example, column select circuitry 78 may be coupled to memory cell columns 90 via corresponding amplifier circuitry 84. In other words, the column select circuitry 78 may be coupled to the first memory cell column 90A via first bit lines 86A and first amplifier circuitry 84A, the second memory cell column 90B via second bit lines 86B and second amplifier circuitry 84B, and the Kth memory cell column 90K via Kth bit lines 86K and Kth amplifier circuitry 84K. In some embodiments, amplifier circuitry 84 may include a driver amplifier that facilitates storing (e.g., writing) data into the memory cells 80 and/or a sense amplifier that facilitates outputting (e.g., reading) data from the memory cells 80.

Additionally, in some embodiments, the column select circuitry 78 may selectively enable reading from and/or writing to a storage location in an activated memory page, for example, by outputting a column select (e.g., logic high) control signal to corresponding amplifier circuitry 84. In other words, to read data (e.g., first data block 56A) from and/or to write data to a storage location in the first memory cell column 90A, the column select circuitry 78 may output a column select control signal to the first amplifier circuitry 84A. Similarly, to read data (e.g., second data block 56B) from and/or to write data to a storage location in the second memory cell column 90B, the column select circuitry 78 may output a column select control signal to the second amplifier circuitry 84B. Furthermore, to read data (e.g., Wth data block 56) from and/or to write data to a storage location in the Kth memory cell column 90K, the column select circuitry 78 may output a column select control signal to the Kth amplifier circuitry 84K. In this manner, memory cells 80 in one or more memory devices 18 may be organized to implement a memory array 28 in a memory sub-system 14.

Returning to the memory-side memory sub-system 14B of FIG. 4, in addition to memory arrays 28 implemented in the memory devices 18, the memory-side memory sub-system 14B may include one or more memory-side caches 24B and/or a memory-side pre-fetch buffer 32B, for example, which is not directly accessible to a processor-side (e.g., host) of the computing system 10 via the memory bus 20A. As described above, a cache 24 and/or a pre-fetch buffer 32 may be implemented in a memory sub-system 14 to provide a dedicated lower (e.g., cache and/or pre-fetch buffer) memory level 50 compared to a memory array 28 implemented in the memory sub-system 14. In other words, in some embodiments, a memory-side cache 24B and/or a memory-side pre-fetch buffer 32B may be implemented to, on average, provide faster data access speed compared to a memory array 28.

Thus, in some embodiments, a memory-side cache 24B and/or a memory-side pre-fetch buffer 32B may also be implemented using volatile memory. For example, the memory-side cache 24B and/or the memory-side pre-fetch buffer 32B may be implemented with static random-access memory (SRAM) while a volatile memory array 28 is implemented with dynamic random-access memory (DRAM). Additionally or alternatively, the memory-side cache 24B and/or the memory-side pre-fetch buffer 32B may be implemented using the same memory type (e.g., DRAM) as a volatile memory array 28. In fact, in some embodiments, one or more memory-side caches 24 may be implemented in a volatile memory device 18.

Moreover, in some embodiments, the memory-side caches 24B may be hierarchically organized. For example, the memory-side caches 24B may include one or more memory channel caches 92 and a shared memory-side cache 94. In some embodiments, a memory channel cache 92 may be dedicated to a corresponding memory channel while the shared memory-side cache 94 may be shared between multiple memory channels. For example, a first one or more memory channel caches 92A may be dedicated to a first memory channel implemented by the first memory channel memory array 74A while an Mth one or more memory channel caches 92M may be dedicated to an Mth memory channel implemented by the Mth memory channel memory array 74M. On the other hand, in some embodiments, the shared memory-side cache 94 may be shared at least by the first memory channel and the Mth memory channel. Thus, in some embodiments, the shared memory-side cache 94 may be implemented to provide a lower (e.g., lowest) memory level in the memory-side memory sub-system 14B compared to the memory channel caches 92. In other embodiments, the shared memory-side cache 94 may be obviated and, thus, not included in the memory-side memory sub-system 14B.

In any case, a memory-side memory controller 34B may generally control data storage in the memory-side memory sub-system 14B. For example, the memory-side memory controller 34B may control whether data is stored in a memory-side cache 24B, the memory-side pre-fetch buffer 32B, a volatile memory device 18, a non-volatile memory device 18, or any combination thereof. In other words, in some embodiments, the memory-side memory controller 34B may control whether the data is stored in a (e.g., lower intermediate) memory level implemented in the memory-side cache 24, a (e.g., higher intermediate) memory level implemented in a volatile memory device 18, a (e.g., highest) memory level implemented in a non-volatile memory device 18, or any combination thereof. Thus, as in the depicted example, the memory-side memory controller 34B may be communicatively coupled to the memory-side caches 24B, the memory-side pre-fetch buffer 32B, and/or the memory devices 18A via one or more memory-side internal buses 20C, for example, to enable the memory-side memory controller 34B to search for target data and/or to output control (e.g., command) signals that instruct (e.g., cause) the memory-side memory sub-system 14B to adjust data storage therein.

As will be described in more detail below, to facilitate improving computing system operational efficiency, in some embodiments, a (e.g., memory-side and/or processor-side) memory controller 34 may control data storage at least in part by selectively disabling pre-fetching and/or caching in a dedicated lower (e.g., cache and/or pre-fetch buffer) memory level 50. For example, the memory controller 34 may selectively disable pre-fetching of a candidate data block 56, which is targeted by a pre-fetch (e.g., read) memory access request, from a memory array 28 (e.g., higher memory level) to a dedicated lower memory level 50 based at least in part on a current state of the memory array 28. Additionally or alternatively, the memory controller 34 may selectively disable caching (e.g., enable cache bypass) of a candidate data block 56, which is targeted (e.g., demanded) for storage in a memory array 28 by a write (e.g., demand) memory access request and/or targeted (e.g., demanded) for retrieval from the memory array 28 by a read (e.g., demand) memory access request, based at least in part on a current state of the memory array 28. In some embodiments, the current state of a memory array 28 may be indicated via corresponding memory array state information 96.

Figures 6, 7:
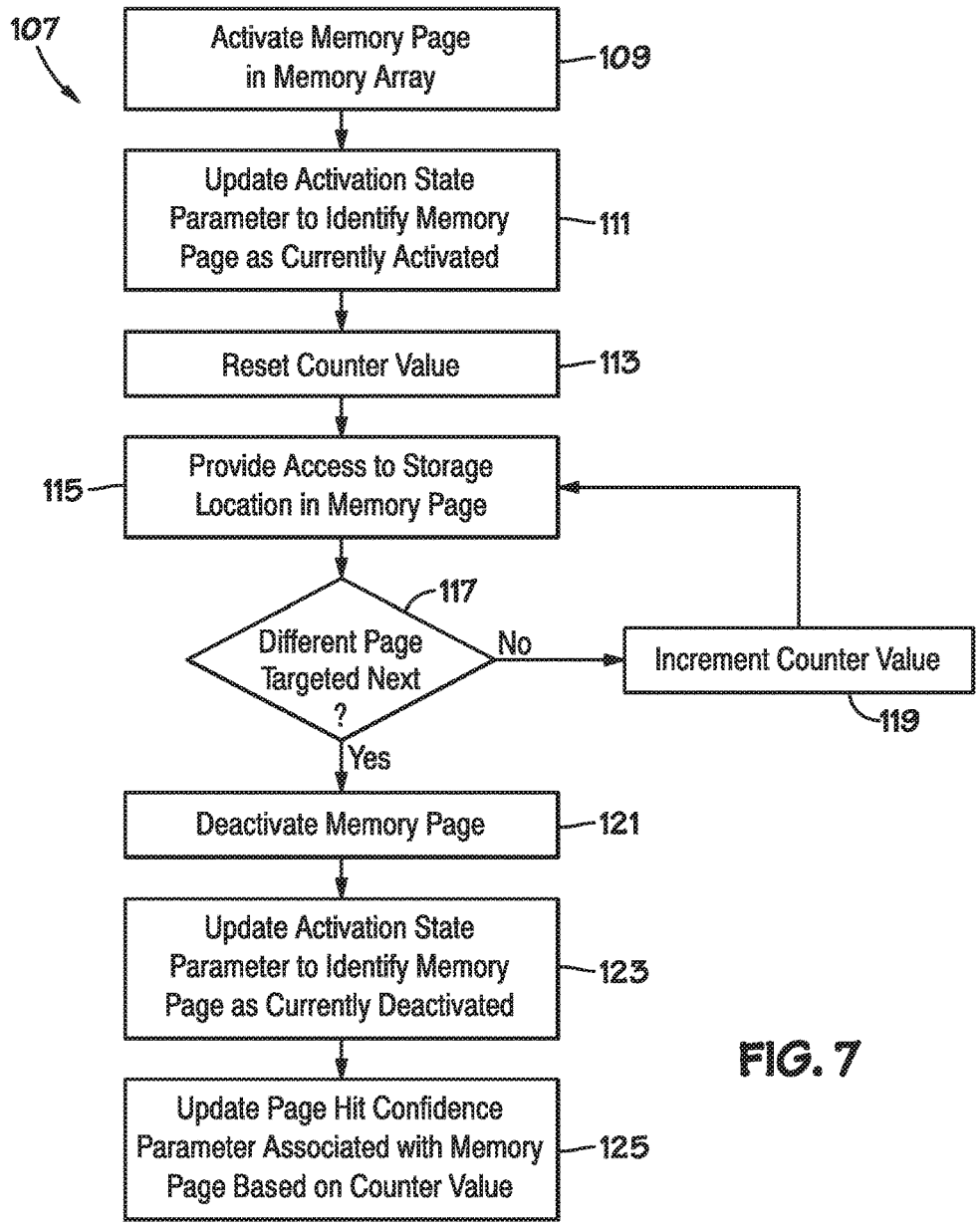
FIG. 6 is a diagrammatic representation of state information associated with the memory array of FIG. 5, in accordance with an embodiment of the present disclosure.
FIG. 7 is a flow diagram of an example process for operating the memory array of FIG. 5 and updating the state information of FIG. 6, in accordance with an embodiment of the present disclosure.

To help illustrate, an example of memory array state information 96A, which may be determined and/or utilized by a (e.g., processor-side or memory-side) memory controller 34, is shown in FIG. 6. As in the depicted example, the memory array state information 96A may include one or more entries (e.g., rows) 98. Additionally, as in the depicted example, each entry 98 may include a page identifier field (e.g., column) 100, an activation state field 102, and a page hit confidence field 104. However, it should be appreciated that the depicted example is merely intended to be illustrative and not limiting. For example, in other embodiments, the memory array state information 96 may additionally or alternatively include other types of data, fields, and/or information.

With regard to the depicted example, each entry 98 in the memory array state information 96A may identify an associated memory page (e.g., memory cell row 88) in its page identifier field 100. For example, a first page identifier parameter in a first entry 98A may indicate that the first entry 98A is associated with a first memory page in a memory array 28 corresponding with the memory array state information 96A. Similarly, a second page identifier parameter in a second entry 98B may indicate that the second entry 98B is associated with a second memory page in the memory array 28 corresponding with the memory array state information 96A.

In some embodiments, a page identifier parameter included in an entry 98 of the memory array state information 96A may identify an associated memory page (e.g., memory cell row 88) via a page (e.g., row) address of the memory page. For example, the first page identifier parameter may be a first page address of the first memory page, thereby indicating that the portion of the memory array state information 96A in the first entry 98A is associated with the first memory page. Similarly, the second page identifier parameter may be a second page address of the second memory page, thereby indicating that the portion of the memory array state information 96A in the second entry 98B is associated with the second memory page.

In other words, at least in such embodiments, memory array state information 96 associated with a memory array 28 may include memory page state information associated with one or more memory pages (e.g., memory cell rows 88) in the memory array 28. That is, continuing with the above example, the portion of the memory array state information 96A in the first entry 98A may be first memory page state information indicative of a current state of the first memory page. Similarly, the portion of the memory array state information 96A in the second entry 98B may be second memory page state information indicative of a current state of the second memory page. At least in some embodiments, organizing memory array state information 96 in this manner may facilitate determining (e.g., retrieving) memory page state information associated with a memory page in response to the memory page being targeted by a memory access request and/or updating the memory page state information associated with the memory page in response to a different memory page being targeted by a subsequent memory access request.

Additionally, as in the depicted example, each entry 98 (e.g., memory page state information) in the memory array state information 96A may associate a corresponding memory page (e.g., memory cell row 88) with an activation state parameter indicated in the activation state field 102 and a page hit confidence parameter indicated in the page hit confidence field 104. In other words, in some embodiments, the first memory page state information (e.g., first entry 98A) may include a first activation state parameter, which indicates a current activation state of the first memory page, and a first page hit confidence parameter, which is indicative of the confidence that a subsequent (e.g., next successive) memory access request will target the first memory page. Similarly, the second memory page state information (e.g., second entry 98B) may include a second activation state parameter, which indicates a current activation state of the second memory page, and a second page hit confidence parameter, which is indicative of the confidence that a subsequent (e.g., next successive) memory access request will target the second memory page.

In some embodiments, an activation state parameter may indicate the current activation state of an associated memory page via an activation state bit. For example, the activation state parameter may indicate that the associated memory page is currently in its activated state when the activation state bit is set (e.g., "1" bit or high). On the other hand, the activation state parameter may indicate that the associated memory page is currently in its deactivated state when the activation state bit is not set (e.g., "0" bit or low).

Since memory (e.g., data) accesses are often somewhat cyclical (e.g., repetitive), to indicate confidence that a subsequent memory access request will target an associated memory page, in some embodiments, the value of a page hit confidence parameter may be set based at least in part on the number of times the memory page was successively targeted during one or more previous activation periods. For example, the value of the first next confidence parameter may be set based at least in part on the number of times the first memory page was successively targeted during one or more previous activation periods of the first memory page. Similarly, the value of the second next confidence parameter may be set based at least in part on the number of times the second memory page was successively targeted during one or more previous activation periods of the second memory page.

To facilitate tracking the number of times a memory page (e.g., memory cell row 88) is targeted (e.g., accessed), as in the example depicted in FIG. 4, a memory sub-system 14 may include a counter 106. In particular, in some embodiments, the memory-side memory controller 34B may update the value of the counter 106 each time a memory page is targeted by a memory access request. As an illustrative non-limiting example, in some embodiments, the memory-side memory controller 34A may load the value of a counter 106 associated with a memory page when the memory page is initially activated to fulfill a memory access request. Additionally, while the memory page remains activated during a current activation period, the memory-side memory controller 34 may increment the value of the associated counter 106 each time the memory page is subsequently targeted by a successive memory access request. On the other hand, when a subsequent memory access request targets a different (e.g., currently deactivated) memory page, the memory-side memory controller may decrement the value of the associated counter 106 and update a page hit confidence parameter included in associated state information accordingly.

As another illustrative non-limiting example, the memory-side memory controller 34B may reset the value of a counter 106 (e.g., to zero) when a memory page is initially activated in response to being targeted by a first memory access request. Additionally, while the memory page remains activated during a current activation period, the memory-side memory controller 34B may increment the value of the counter 106 each time the memory page is subsequently targeted by a successive memory access request. For example, when a second memory access request to be fulfilled directly after the first memory access request also targets the memory page, the memory-side memory controller 34B may increment the value of the counter 106 from a value of zero to a value of one and so on.

On the other hand, to facilitate indicating the confidence that a subsequent memory access request will target the memory page during a subsequent activation period, the memory-side memory controller 34B may update the value of a next confidence parameter associated with the memory page based at least in part on the value the counter 106 resulting at the end of its current activation period. In other words, in response to a memory page being transitioned from its activated state to its deactivated state (e.g., at end of activation period), the memory-side memory controller 34B may update the value of a next confidence parameter included in associated state information, for example, in addition to updating the value of an activation state parameter included in the associated state information to indicate that the memory page is now in its deactivated state. Moreover, as described above, in response to a memory page being transitioned from its deactivated state to its activated state (e.g., at beginning of activation period), the memory-side memory controller 34B may update the value of an associated activation state parameter included in associated state information to indicate that the memory page is now in its activated state.

To help further illustrate, an example of a process 107 for operating a memory array 28 and responsively updating corresponding state information is described in FIG. 7. Generally, the process 107 includes activating a memory page in a memory array (process block 109), updating an activation state parameter to identify the memory page as currently activated (process block 111), resetting a counter value (process block 113), providing access to a storage location in the memory page (process block 115), determining whether a different page is targeted next (decision block 117), and incrementing the counter value when a different memory page is not targeted next (process block 119). Additionally, when a different memory page is targeted next, the process 107 includes deactivating the memory page (process block 121), updating the activation state parameter to identify the memory page as currently deactivated (process block 123), and updating a next confidence parameter associated with the memory page based on the counter value (process block 125).

Although described in a particular order, which represents a particular embodiment, it should be noted that the process 107 may be performed in any suitable order. Additionally, embodiments of the process 107 may omit process blocks and/or include additional process blocks. Moreover, in some embodiments, the process 107 may be implemented at least in part by executing instructions stored in a tangible, non-transitory, computer-readable medium, such as memory implemented in a memory controller 34, using processing circuitry, such as a processor implemented in the memory controller 34.

Accordingly, in some embodiments, a (e.g., main and/or memory-side) memory controller 34 may instruct a (e.g., memory-side) memory sub-system 14 to activate a memory page (e.g., memory cell row 88) in a memory array 28, for example, due to memory page being targeted while in its deactivated state (process block 109). As will be described in more detail below, in some embodiments, a memory access request may include one or more access parameters indicative of a storage location for which access is being requested. For example, the one or more access parameters be indicative of a row (e.g., page) address and column address pairing that identifies the target storage location.

Additionally, to facilitate controlling activation state of memory pages (e.g., memory cells row 88) in a memory array 28, as described above, row select (e.g., decoder) circuitry 76 may be coupled to each of the memory pages via a corresponding word line 82. For example, the row select circuitry 76 may pre-charge a memory page by outputting a pre-charge control signal via a corresponding word line 82 and, subsequently, activate the memory page by outputting, via the corresponding word line 82, an activation (e.g., logic high) control signal that causes the switching component of each memory cell 80 in the memory page to electrically couple (e.g., connect) its storage component to a corresponding bit line 86. As such, in some embodiments, the memory controller 34 may instruct the row select circuitry 76 to pre-charge and activate a memory page (e.g., memory cell row 88) including a storage location (e.g., memory address) targeted by a memory access request, for example, using a page (e.g., row) address determined based on one or more access parameters included in the memory access request.

Furthermore, as will be described in more detail below, in response to receipt of a memory access request, the memory controller 34 may determine state information (e.g., memory array state information 96 and/or memory page state information) indicative of a current state of a memory page including a storage location targeted by the memory access request. For example, using a page (e.g., row) address determined based on one or more access parameters included in the memory access request, the memory controller may retrieve state information associated with the target memory page from a cache 24 (e.g., into one of more of its register). As described above, in some embodiments, state information associated with a memory page may include a page hit confidence parameter, which is indicative of the confidence that a subsequent (e.g., next successive) memory access request will target the memory page, and an activation state parameter, which indicates a current activation state of the memory page.

Accordingly, when a target memory page is initially activated (e.g., at beginning of activation period), the memory controller 34 may update an activation state parameter associated with the target memory page to indicate that the memory page is now in its activated state (process block 111). As described above, in some embodiments, an activation state parameter may indicate the current activation state of an associated memory page via an activation state bit. For example, the activation state bit may indicate that an associated memory page is currently in its activated state when set (e.g., "1" bit or high) and that the associated memory page is currently in its activated state when not set (e.g., "0" bit or low). Thus, at least in such embodiments, when a memory page is transitioned between its deactivated state and its activated state, the memory controller 34 may update associated memory page state information at least in part by toggling a corresponding activation state bit.

Additionally, when the target memory page is initially activated (e.g., at beginning of activation period), the memory controller 34 may reset the value of a counter 106 (process block 113). As described above, in some embodiments, the memory controller 34 may use the counter 106 to facilitate tracking the number of times a memory page is targeted during an activation period. Thus, at least in such embodiments, the memory controller 34 resets the counter 106 to a value of zero at the beginning of the activation period.

Furthermore, to facilitate fulfilling a memory access request, the memory controller 34 may instruct the memory sub-system 14 to provide access to a storage location in a memory page targeted by the memory access request (process block 115). As described above, in some embodiments, a memory sub-system 14 may provide access to a storage location in a memory array 28 to enable writing (e.g., storing) data to the storage location and/or to enable reading (e.g., retrieving) data from the storage location. Additionally, as described above, to facilitate writing to and/or reading from storage locations in a memory array 28, in some embodiments, amplifier circuitry 84 may be coupled to each of the storage locations via corresponding bit lines 86. For example, first amplifier circuitry 84A may be coupled to each storage location in a first memory cell column 90A of the memory array 28 via first bit lines 86A, second amplifier circuitry 84B may be coupled to each storage location in a second memory cell column 90B via second bit lines 86B, and so on.

Moreover, to facilitate selectively accessing different storage locations in an activated memory page (e.g., memory cell row 88), as described above, column select (e.g., decoder) circuitry 78 may be coupled to amplifier circuitry 84 of a memory array 28. For example, to provide access to a storage location included in the first memory cell column 90A, the column select circuitry 78 may output a column select (e.g., logic high) control signal to the first amplifier circuitry 84A. Similarly, to provide access to a storage location included in the second memory cell column 90B, the column select circuitry 78 may output the column select control signal to the second amplifier circuitry 84B.

In other words, to facilitate providing access to a storage location targeted by a memory access request, the memory controller 34 may instruct the column select circuitry 78 to output a column select control signal to amplifier circuitry 84 coupled to a corresponding memory cell column 90, for example, using a column address determined based on one or more access parameters included in the memory access request. Additionally, as described above, to facilitate providing access to a storage location targeted by a memory access request, the memory controller 34 may instruct the row select circuitry 76 to output an activation control signal to a memory page (e.g., memory cell row 88) including the target storage location. In other words, in some embodiments, a memory controller 34 may operate in this manner to facilitate fulfilling a memory access request, for example, by enabling data to be read (e.g., retrieved) from and/or written (e.g., stored) to a storage location targeted by the memory access request.

After fulfilling a memory access request, the memory controller 34 may determine whether a next subsequent (e.g., successive) memory access request to be fulfilled by the memory sub-system 14 targets a different memory page (decision block 117). In other words, the memory controller 34 may determine whether the memory page including a storage location targeted by the next subsequent memory access request matches a memory page including a storage location targeted by a directly previous memory access request. When the next subsequent memory access request targets the same memory page as the directly previous memory access request, the memory controller 34 may increment the value of the counter 106 (process block 119). For example, the memory controller 34 may increment the counter 106 from a value of zero to a value of one when the next subsequent memory access request targets a currently activated memory page, from a value of one to a value of two when a memory access request to be fulfilled directly after the next subsequent memory access request also targets the currently activated memory page, and so on.

On the other hand, when the next subsequent memory access request targets a different memory page compared to a directly previous memory access request, the memory controller 34 may instruct the memory sub-system 14 to deactivate the memory page targeted by the directly previous memory access request, for example, in addition to activating the different memory page targeted by the next subsequent memory access request (process block 121). To deactivate a currently activated memory page, in some embodiments, the memory controller 34 may instruct the row select circuitry 76 to cease supply of an activation (e.g., logic high) control signal to a corresponding word line 82. Additionally or alternatively, the memory controller 34 may instruct the row select circuitry 76 to supply of a deactivation (e.g., logic low) control signal to the corresponding word line 82.

In any case, to facilitate indicating a current state of a memory page, as described above, associated state information may be updated in response to the memory page being transitioned from its activated state to its deactivated state. In particular, when the target memory page is subsequently deactivated (e.g., at end of activation period), the memory controller 34 may update the activation state parameter included in the state information associated with the memory page to indicate that the memory page is now is its deactivated state (process block 123). For example, the memory controller 34 may update the associated memory page state information at least in part by toggling a corresponding activation state bit.

Additionally, when a memory page is subsequently deactivated (e.g., at end of activation period), the memory controller 34 may update the value of the page hit confidence parameter included in associated state information based at least in part on the value of the counter 106 resulting at the end of the activation period. In some embodiments, the memory controller 34 may update the value of a next confidence parameter associated with a memory page independent of its previous state (e.g., next confidence parameter). For example, in such embodiments, the memory controller 34 may update the value of the page hit confidence parameter associated with the memory page by overwriting a previous value of the page hit confidence parameter (e.g., determined at beginning of activation period) with the value of the counter 106 resulting at the end of the activation period.

To facilitate improving accuracy of a next target confidence prediction made based on a page hit confidence parameter associated with a memory page, in other embodiments, the memory controller 34 may update the value of the next confidence parameter based at least in part on or more previous states of the memory page. For example, at the end of an activation period, in such embodiments, the memory-side memory controller 34B may update the page hit confidence parameter associated with the memory page based on an (e.g., weighted) average of the value of the counter 106 resulting at the end of the activation period and the value of the page hit confidence parameter associated with the memory page at the beginning of the activation period, thereby producing a moving average. Additionally or alternatively, in such embodiments, the memory controller 34 may update the page hit confidence parameter by averaging the values of the counter 106 resulting at the end of multiple activation periods of the memory page, for example, such that values of the counter 106 resulting at the end of more recent activation periods are weighted more heavily than counter values results at the end of older activation periods.

In this manner, a memory sub-system 14 may operate to provide access to one or more storage locations in a memory array 28 and update memory array state information 96 associated with the memory array 28 accordingly. As described above, a memory-side memory sub-system 14B may provide memory access to a processor-side of a computing system 10 in response to receipt of a memory access request via the memory bus 20A. For example, in response to receipt of a write (e.g., demand) memory access request, the memory-side memory controller 34B may instruct the memory-side memory sub-system 14B to store an instance of a data block 56 targeted (e.g., demanded) for storage by the write memory access request in one or more hierarchical memory levels implemented in the memory-side memory sub-system 14B. Additionally or alternatively, in response to receipt of a read (e.g., pre-fetch or demand) memory access request, the memory-side memory controller 34B may identify a data block 56 targeted for retrieval by the read memory access request and instruct the memory-side memory sub-system 14B to return the target data block 56 to the processor-side of the computing system 10 (e.g., processor-side memory sub-system 14A and/or processing sub-system 12) via the memory bus 20A.

Figure 8:
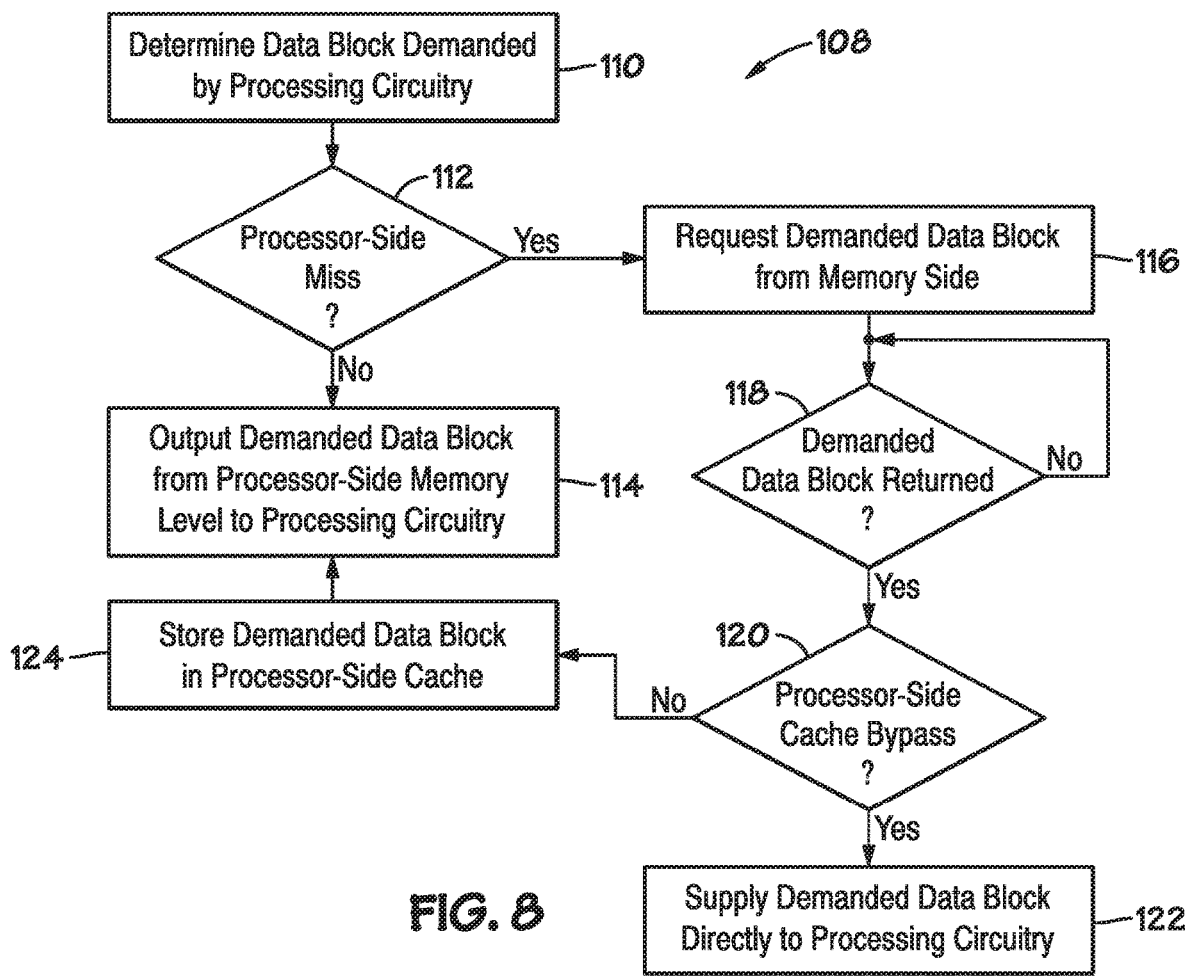
FIG. 8 is a flow diagram of an example process for operating the processor-side memory sub-system of FIG. 2, in accordance with an embodiment of the present disclosure.

To help further illustrate, an example of a process 108 for operating a processor-side of a computing system 10 is described in FIG. 8. Generally, the process 108 includes determining a data block demanded by processing circuitry (process block 110), determining whether the demanded data block results in a processor-side miss (decision block 112), and outputting the demanded data block from a processor-side memory level to the processing circuitry when the demanded data block does not result in a processor-side miss (process block 114). Additionally, when the demanded data block results in a processor-side miss, the process 108 includes requesting the demanded data block from a memory-side (process block 116), determining whether the demanded data block has been returned from the memory-side (decision block 118), and determining whether a processor-side cache bypass has been enabled (decision block 120). Furthermore, after the demanded data block is returned from the memory-side, the process 108 includes supplying the demanded data block directly to the processing circuitry when the processor-side cache bypass has been enables (process block 122) and storing the demanded data block in a processor-side cache when the processor-side cache bypass has not been enabled (process block 124).

Although described in a particular order, which represents a particular embodiment, it should be noted that the process 108 may be performed in any suitable order. Additionally, embodiments of the process 108 may omit process blocks and/or include additional process blocks. Moreover, in some embodiments, the process 108 may be implemented at least in part by executing instructions stored in a tangible, non-transitory, computer-readable medium, such as memory implemented in a memory controller 34, using processing circuitry, such as a processor implemented in the memory controller 34.

Accordingly, in some embodiments, a processor-side memory controller 34A in a processor-side memory sub-system 14A of a computing system 10 may determine a data block 56 demanded (e.g., targeted) by processing circuitry 16 in a processing sub-system 12 of the computing system 10 (process block 110). In some embodiments, processing circuitry 16 may identify a demanded data block 56 using a corresponding (e.g., target) virtual memory address. Based at least in part on the virtual memory address, in some embodiments, the processor-side memory controller 34A may determine a corresponding (e.g., target) physical memory address, which indicates storage location of the demanded data block 56 in the computing system 10.

Additionally, the processor-side memory controller 34A may determine whether the demanded data block 56 results in a processor-side miss (decision block 112). In some embodiments, a memory controller 34 may determine whether a data block 56 is stored in a dedicated lower memory level 50 based at least in part on a virtual memory address and/or a physical memory address associated with the data block 56. For example, based at least in part on its virtual memory address and physical memory address, the memory controller 34 may determine a target value of a tag parameter 60 (e.g., metadata 58) expected to be associated with the demanded data block 56.

By searching valid lines 52 included in each processor-side dedicated lower (e.g., cache and/or pre-fetch buffer) memory level 50 based on the target tag parameter value, the processor-side memory controller 34A may determine whether the demanded data block 56 results in a processor-side miss. For example, when the target tag parameter value does not match the tag parameter values included in any of the processor-side dedicated lower memory levels 50, the processor-side memory controller 34A may determine that the demanded data block 56 results in a processor-side miss. On the other hand, when the target tag parameter value is included in one or more lines 52 of the processor-side dedicated lower memory levels 50, the processor-side memory controller 34A may determine that the demanded data block 56 results in a processor-side hit and, thus, does not result in a processor-side miss.

When the demanded data block 56 does not result in a processor-side miss, the processor-side memory controller 34A may instruct a processor-side dedicated lower (e.g., cache and/or pre-fetch buffer) memory level 50 to supply the demanded data block 56 to the processing circuitry 16, for example, to facilitate improving data retrieval speed and, thus, operational efficiency of the computing system 10 (process block 114). In some embodiments, a processor-side dedicated lower memory level 50 may output a line 52 with a valid tag parameter value that matches the target tag parameter value expected to be associated with the demanded data block 56. When stored in a higher memory level (e.g., shared processor-side cache 48), in some embodiments, the demanded data block 56 may pass through one or more lower memory levels (e.g., private processor-side caches 46) in the processing sub-system 12 before reaching the processing circuitry 16.

On the other hand, when it results in a processor-side miss, the processor-side memory controller 34A may request return of the demanded data block 56 from a memory-side of the computing system 10 (process block 116). As described above, to request return of a demanded data block 56, in some embodiments, a processor-side memory controller 34A may generate a read (e.g., demand) memory access request, which may be stored in a request queue 66 before output to a memory-side of the computing system 10 via a memory (e.g., external communication) bus 20A. Additionally, as described above, in some embodiments, a processor-side bus interface 68 may be coupled between the memory bus 20A and one or more processor-side internal buses 20B. Thus, at least in such embodiments, the processor-side bus interface 68 may receive a memory access request via one or more processor-side internal buses 20B and route the memory access request to the memory bus 20A.

Moreover, as described above, a read memory access request may include one or more read access parameters, which may be used by the memory-side of the computing system 10 to retrieve a data block 56 targeted (e.g., demanded) by the read memory access request. For example, the one or more read access parameters may include a virtual memory address used by the processing circuitry 16 to identify the target data block 56, a physical memory address (e.g., row address and column address pairing) at which the target data block 56 is expected to be stored in a memory-side of the computing system 10, size (e.g., bit depth) of the target data block 56, and/or a read enable indicator (e.g., bit). As such, based at least in part on the value of one or more read access parameters indicated in a read (e.g., demand) memory access request, a memory-side memory sub-system 14B may identify and return a demanded data block 56 targeted by the read memory access request.

Figure 9:
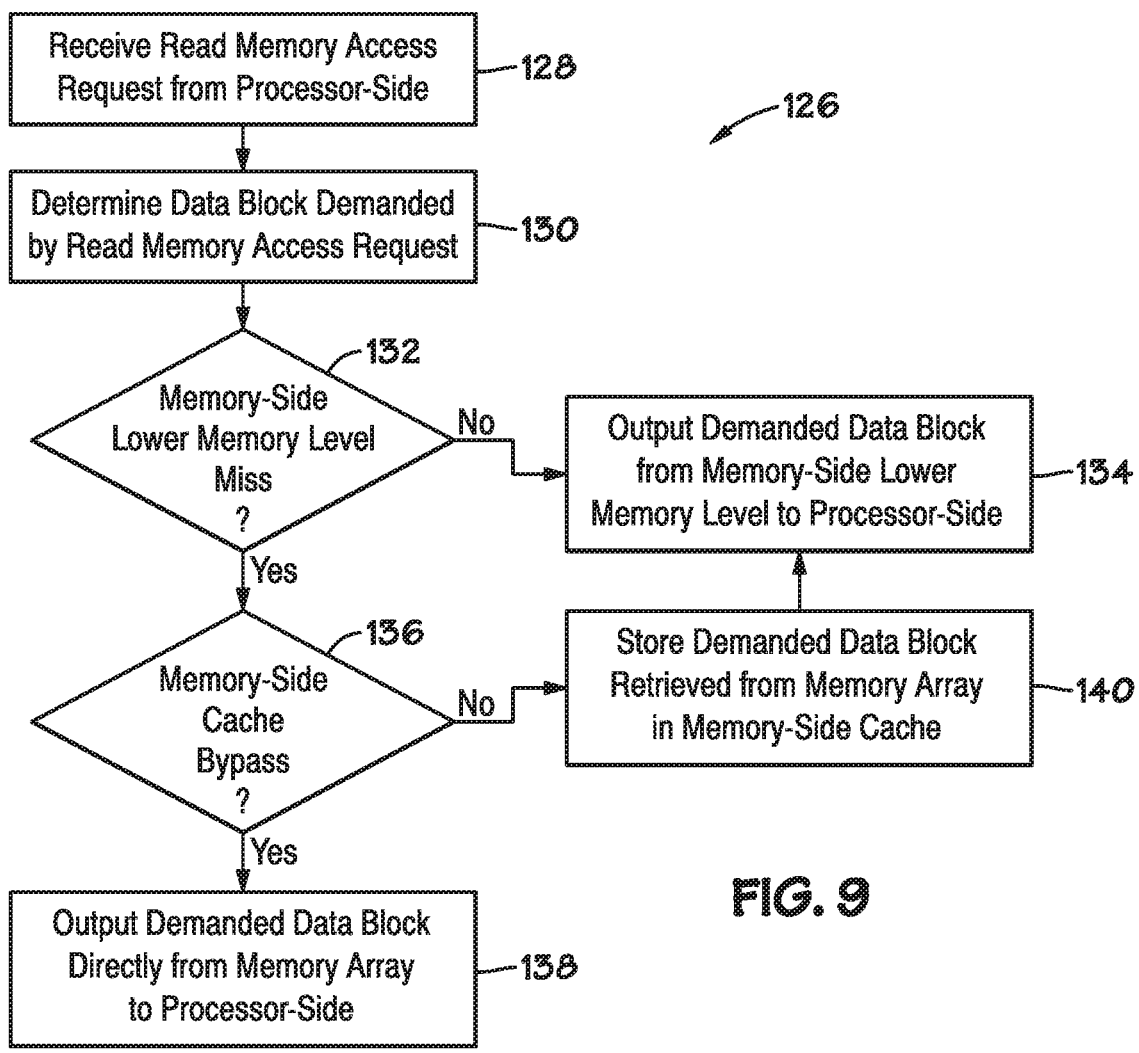
FIG. 9 is a flow diagram of an example process for operating the memory-side memory sub-system of FIG. 4 in response to a read memory access request, in accordance with an embodiment of the present disclosure.

To help illustrate, an example of a process 126 for operating a memory-side memory sub-system 14B is described in FIG. 9. Generally, the process 126 includes receiving a read memory access request from a processor-side (process block 128), determining a data block demanded by the read memory access request (process block 130), determining whether the demanded data block results in a memory-side lower memory level miss (decision block 132), and outputting the demanded data block from a memory-side lower memory level to the processor-side when the demanded data block does not result in a memory-side lower memory level miss (process block 134). Additionally, when the demanded data block results in a memory-side lower memory level miss, the process 126 includes determining whether a memory-side cache bypass has been enabled (decision block 136), outputting the demanded data block from a memory array directly to the processor-side when the memory-side cache bypass is enabled (process block 138), and storing the demanded data block retrieved from the memory array in a memory-side cache when the memory-side cache bypass has not been enabled (process block 140).

Although described in a particular order, which represents a particular embodiment, it should be noted that the process 126 may be performed in any suitable order. Additionally, embodiments of the process 126 may omit process blocks and/or include additional process blocks. Moreover, in some embodiments, the process 126 may be implemented at least in part by executing instructions stored in a tangible, non-transitory, computer-readable medium, such as memory implemented in a memory controller 34, using processing circuitry, such as a processor implemented in the memory controller 34.

Accordingly, in some embodiments, a memory-side memory controller 34B implemented in a memory-side memory sub-system 14B of a computing system 10 may receive a read (e.g., demand) memory access request output from a processor-side of the computing system 10 (process block 128). As described above, in some embodiments, a processor-side memory sub-system 14A may output a memory access request via a memory bus 20A and a memory-side bus interface 70 may be coupled between the memory bus 20A and one or more memory-side internal buses 20C. Thus, at least in such embodiments, the memory-side bus interface 70 may receive a memory access request from the memory bus 20A and route the memory access request to the memory-side memory controller 34B via one or more memory-side internal buses 20C.

Additionally, as described above, in some embodiments, a memory access request may include one or more access parameters to be used by a memory sub-system 14 to provide memory (e.g., data) access. For example, the one or more access parameters may include a virtual memory address used by processing circuitry 16 to identify a data block 56 demanded by the memory access request and/or a physical memory address (e.g., row address and column address pairing) at which the data block 56 demanded by the memory access request is expected to be stored in the memory sub-system 14. Accordingly, in such embodiments, the memory-side memory controller 34B may determine (e.g., identify) a data block 56 demanded for retrieval by the read memory access request and/or a demanded memory address associated with the data block 56 based at least in part on one or more read access parameters included in the read memory access request (process block 130).

Furthermore, the memory-side memory controller 34B may determine whether the demanded data block 56 results in a memory-side lower memory level miss (decision block 132). As described above, in some embodiments, a memory controller 34 may determine whether a data block 56 is stored in a dedicated lower (e.g., cache and/or pre-fetch buffer) memory level 50 based at least in part on a virtual memory address and/or a physical memory address associated with the data block 56. For example, based at least in part on its virtual memory address and physical memory address, the memory controller 34 may determine a target value of a tag parameter 60 (e.g., metadata 58) expected to be associated with the demanded data block 56.

By searching valid lines 52 included in each memory-side dedicated lower (e.g., cache and/or pre-fetch buffer) memory level 50 based on the target tag parameter value, the memory-side memory controller 34B may determine whether the demanded data block 56 results in a memory-side lower memory level miss. For example, when the target tag parameter value does not match the tag parameter values included in any of the memory-side dedicated lower memory levels 50, the memory-side memory controller 34B may determine that the demanded data block 56 results in a memory-side lower memory level miss. On the other hand, when the demanded tag parameter value is included in one or more valid lines 52 of the memory-side dedicated lower memory levels 50, the memory-side memory controller 34B may determine that the demanded data block 56 results in a memory-side lower memory level hit and, thus, does not result in a memory-side lower memory level miss.

When the demanded data block 56 does not result in a memory-side lower memory level miss, the memory-side memory controller 34B may instruct a memory-side dedicated lower (e.g., cache and/or pre-fetch buffer) memory level 50 to output the demanded data block 56 to a processor-side of the computing system 10 via the memory bus 20A, for example, to facilitate improving data retrieval speed and, thus, operational efficiency of the computing system 10 (process block 134). In some embodiments, a memory-side dedicated lower memory level 50 may output a line 52 with a tag parameter value that matches the target tag parameter value expected to be associated with the demanded data block 56. When stored in a higher memory level (e.g., memory channel cache 92), in some embodiments, the demanded data block 56 may pass through one or more lower memory levels (e.g., shared memory-side cache 94) in the memory-side memory sub-system 14B before being output to the memory bus 20A.

On the other hand, when the demanded data block 56 results in a memory-side lower memory level miss, the memory-side memory controller 34B may determine whether a memory-side cache bypass has been enabled (process block 136). As described above, in some instances, a copy (e.g., instance) of a demanded data block 56 retrieved from a memory array 28 (e.g., higher memory level) may additionally be stored in a memory-side cache 24B (e.g., dedicated lower memory level 50) in an effort to improve operational efficiency of the computing system 10, for example, by enabling the memory-side memory sub-system 14B to return the data block 56 from the memory-side cache 24B instead of the memory array 28 if the data block 56 is subsequently targeted (e.g., demanded). However, at least in some instances, automatically caching a demanded data block 56 in a memory-side cache 24B may actually reduce computing system operational efficiency, for example, due to the limited storage capacity of the memory-side cache 24B resulting in another data block 56 being prematurely evited and/or activation of a memory page in the memory array 28 at which the data block 56 is stored increasing power consumption.

As such, to facilitate improving computing system operational efficiency, in some embodiments, a (e.g., memory-side and/or processor-side) memory controller 34 may selectively disable caching of a demanded data block 56, which is retrieved from a memory array 28, in a dedicated cache 24. For example, by enabling a memory-side cache bypass, the memory-side memory controller 34B may disable caching of the demanded data block 56 in a memory-side cache 24B. Additionally or alternatively, by enabling a processor-side cache bypass, a processor-side memory controller 34A may disable caching of the demanded data block 56 in a processor-side cache 24A. Moreover, in some embodiments, the memory controller 34 may selectively disable caching (e.g., enabling cache bypass) based at least in part on a current state of the memory array 28 and/or a current state of one or more memory pages in the memory array 28.

Figure 10:
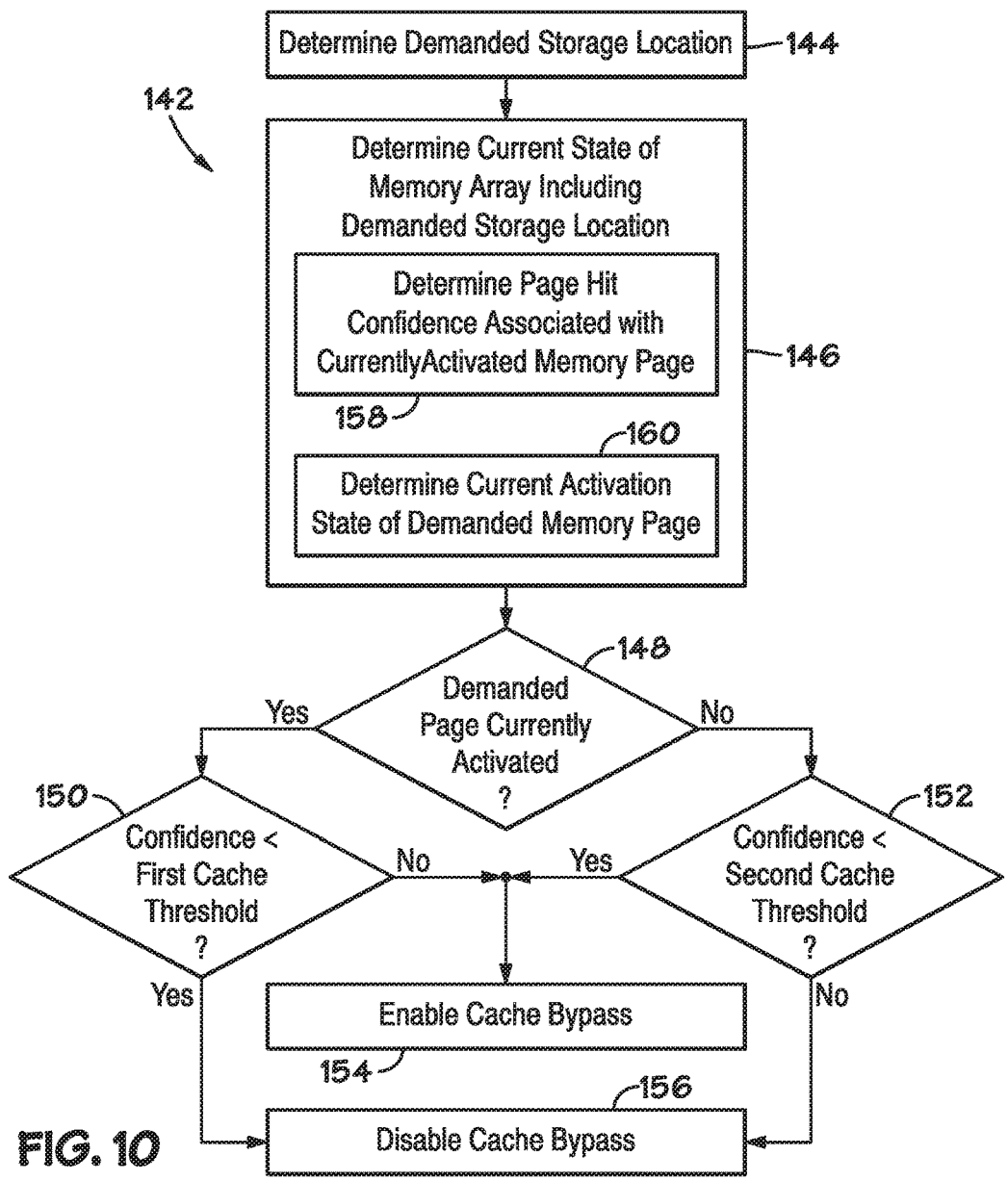
FIG. 10 is a flow diagram of an example process for determining whether to enable a cache bypass in the memory sub-system of FIG. 1, in accordance with an embodiment of the present disclosure.

To help illustrate, an example of a process 142 for selectively enabling a (e.g., memory-side and/or processor-side) cache bypass is described in FIG. 10. Generally, the process 142 includes determining a demanded storage location (process block 144), determining a current state of a memory array included the demanded storage location (process block 146), and determining whether a demanded memory page is currently activated (decision block 148). Additionally, the process 142 includes determining whether a next target confidence associated with a currently activated memory page is less than a first cache confidence threshold when the demanded memory page is currently activated (decision block 150) and determining whether the next target confidence associated with the currently activated memory page is greater than a second cache confidence threshold when the demanded memory page is not currently activated (decision block 152).

Furthermore, the process 142 includes enabling a cache bypass when the demanded memory page is currently activated and the next target confidence associated with the currently activated memory page is not less than the first cache confidence threshold or when the demanded memory page is not currently activated and the next target confidence associated with the currently activated memory page is greater than the second cache confidence threshold (process block 154). Moreover, the process 142 includes disabling the cache bypass when the demanded memory page is currently activated and the next target confidence associated with the currently activated memory page is less than the first cache confidence threshold or when the demanded memory page is not currently activated and the next target confidence associated with the currently activated memory page is not greater than the second cache confidence threshold (process block 156).

Although described in a particular order, which represents a particular embodiment, it should be noted that the process 142 may be performed in any suitable order. Additionally, embodiments of the process 142 may omit process blocks and/or include additional process blocks. Moreover, in some embodiments, the process 142 may be implemented at least in part by executing instructions stored in a tangible, non-transitory, computer-readable medium, such as memory implemented in a memory controller 34, using processing circuitry, such as a processor implemented in the memory controller 34.

Accordingly, in some embodiments, a (e.g., memory-side and/or processor-side) memory controller 34 may determine a storage location (e.g., memory address) for which access is being demanded (process block 144). For example, the demanded storage location may be a storage location in a memory array 28 at which a data block 56 targeted for retrieval by a read (e.g., demand) memory access request is expected to be stored. Additionally or alternatively, the demanded storage location may be a storage location in a memory array 28 at which a write (e.g., demand) memory access request targets storage of a data block 56. In other words, in response to receipt of a demand memory access request, in some embodiments, the memory controller 34 may determine the demanded storage location (e.g., memory address) associated with the demand memory access request based at least in part on one or more of its access parameters.

Additionally, the memory controller 34 may determine a current state of a memory array 28 including the demanded storage location (process block 146). As described above, in some embodiments, the current state of a memory array 28 may be indicated via corresponding memory array state information 96. Additionally, as described above, in some embodiments, memory array state information 96 associated with a memory array 28 may include memory page state information (e.g., entries 98) indicative of a current state of one or more memory pages (e.g., memory cell rows 88) in the memory array 28. In other words, at least in such embodiments, the memory array state information 96 may include memory page state information associated with a memory page including the demanded storage location and/or memory page state information associated with a memory page in the memory array 28 that is currently in its activated state, for example, due to the memory page being targeted by a directly previous memory access request.

Moreover, as described above, in some embodiments, memory page state information associated with a memory page may include an activation state parameter, which indicates whether the memory page is currently in its activated state or its deactivated state, and a page hit confidence parameter, which is indicative of the confidence (e.g., likelihood and/or probability) that a subsequent (e.g., next successive) memory access request will target the memory page. As such, at least in such embodiments, the memory controller 34 may determine (e.g., predict) the confidence that a next subsequent memory access request will target the currently activated memory page based at least in part on the value of a page hit confidence parameter indicated in associated memory page state information (process block 158). Additionally, at least in such embodiments, the memory controller 34 may determine a current activation state of the demanded memory page (process block 160) and, thus, whether the demanded memory page is the currently activated memory page or a currently deactivated memory page based at least in part on the value of an activation state parameter indicated in associated memory page state information (decision block 148).

When the demanded memory page is the currently activated memory page, the memory controller 34 may selectively enable cache bypassing (e.g., disable caching) based at least in part on a comparison of an associated page hit confidence parameter and a first cache confidence threshold (decision block 150). In particular, when the value of the associated page hit confidence parameter is less than the first cache confidence threshold, the memory controller 34 may determine (e.g., predict) that a subsequent (e.g., next successive) memory access request is expected (e.g., more likely than not) to target a different memory page and, thus, the (e.g., demanded and/or currently activated) memory page including the demanded storage location is expected to be in its deactivated state access to the memory page is subsequently targeted. As such, when the value of the associated page hit confidence parameter is less than the first cache confidence threshold, the memory controller 34 may disable cache bypassing, thereby enabling caching of a (e.g., candidate) data block 56, which is retrieved from and/or to be stored in the memory array 28, in a dedicated (e.g., processor-side and/or memory-side) cache 24 (process block 156). At least in some instances, selectively disabling a (e.g., memory-side and/or processor-side) cache bypass in this manner may facilitate improving computing system operational efficiency, for example, by enabling the candidate data block 56, if subsequently targeted, to be supplied from the cache 24 instead of a memory page in a memory array 28 that is expected to be in its deactivated state.

Conversely, when the demanded memory page is the currently activated memory page and the value of an associated page hit confidence parameter is not less than the first cache confidence threshold, the memory controller 34 may determine (e.g., predict) that a subsequent (e.g., next successive) memory access request is expected (e.g., more likely than not) to target the same memory page and, thus, the (e.g., demanded and/or currently activated) memory page including the demanded storage location is expected to be in its activated state when subsequently targeted. As such, when the value of the associated page hit confidence parameter is not less than the first cache confidence threshold, the memory controller 34 may enable cache bypassing, thereby disabling caching of a (e.g., candidate or demanded) data block 56, which is retrieved from and/or to be stored in the memory array 28, in a dedicated (e.g., processor-side and/or memory-side) cache 24 (process block 154). At least in some instances, selectively enabling a (e.g., memory-side and/or processor-side) cache bypass in this manner may facilitate improving computing system operational efficiency, for example, by reducing likelihood of polluting the cache 24 and instead enabling the candidate data block 56, if subsequently demanded, to be supplied from a memory page that is expected to be in its activated state.

On the other hand, when the demanded memory page is a currently deactivated memory page, the memory controller 34 may selectively enable cache bypassing (e.g., disable caching) based at least in part on a comparison of a page hit confidence parameter associated with a currently activated memory page and a second cache confidence threshold (decision block 152). In particular, when the value of the page hit confidence parameter associated with the currently activated memory page is greater than the second cache confidence threshold, the memory controller 34 may determine (e.g., predict) that a subsequent (e.g., next successive) memory access request is expected (e.g., more likely than not) to target the currently activated memory page and, thus, the (e.g., demanded and/or currently deactivated) memory page including the demanded storage location is expected to be in its deactivated state when access is subsequently targeted. As such, when the value of the page hit confidence parameter associated with the currently activated memory page is greater than the second cache confidence threshold, the memory controller 34 may enable cache bypassing, thereby disabling caching of a (e.g., candidate or demanded) data block 56, which is retrieved from and/or to be stored in the memory page of the memory array 28, in a dedicated (e.g., processor-side and/or memory-side) cache 24 (process block 154). At least in some instances, selectively enabling a (e.g., memory-side and/or processor-side) cache bypass in this manner may facilitate improving computing system operational efficiency, for example, by reducing likelihood of the candidate data block 56 polluting the cache 24 and/or obviating power consumption resulting from—activating the target memory page and subsequently re-activating the currently activated memory page.

Conversely, when the demanded memory page is a currently deactivated memory page and the value of the page hit confidence parameter associated with the currently activated memory page is not greater than the second cache confidence threshold, the memory controller 34 may determine (e.g., predict) that a subsequent memory access request is expected (e.g., more likely than not) to target a (e.g., currently deactivated) memory page different from the currently activated memory page. However, since a memory array 28 may concurrently include multiple deactivated memory pages, at least in some instances, such a determination may have limited relevance to whether the demanded memory page will be in its activated state or its deactivated state when subsequent targeted. As such, when the value of the page hit confidence parameter is not greater than the second cache confidence threshold, the memory controller 34 may disable cache bypassing, thereby enabling caching of a (e.g., candidate) data block 56, which is retrieved from and/or to be stored in the memory array 28, in a dedicated (e.g., processor-side and/or memory-side) cache 24 (process block 156). At least in some instances, selectively disabling a (e.g., memory-side and/or processor-side) cache bypass in this manner may facilitate improving computing system operational efficiency, for example, by enabling the candidate data block 56, if subsequently targeted, to be supplied from the cache 24 instead of the memory array 28.

Nevertheless, in other embodiments, the memory controller 34 may automatically disable a cache bypass when the demanded memory page is currently in its deactivated state. Moreover, in some embodiments, the value of the first cache confidence threshold, which is used when the demanded memory page is in its activated state, and the value of the second cache confidence threshold, which is used when the demanded memory page is in its deactivated state, may differ. For example, the value of the first cache confidence threshold may be greater than the value of the second cache confidence threshold or vice versa. In other embodiments, the value of the first cache confidence threshold may match the value of the second cache confidence threshold. In this manner, a (e.g., memory-side and/or processor-side) memory sub-system 14 may operate to selectively enable a (e.g., memory-side and/or processor-side) cache bypass based at least in part on a current state of a memory array 28 implemented in the memory sub-system 14.

Returning to the process 126 of FIG. 9, when the memory-side cache bypass is enabled, the memory-side memory controller 34B may instruct the memory-side memory sub-system 14B to output (e.g., return) the demanded data block 56 from a memory array 28 directly to the processor-side of the computing system 10 via the memory bus 20A (process block 138). On the other hand, when the memory-side cache bypass is not enabled (e.g., disabled), the memory-side memory controller 34B may instruct the memory-side memory sub-system 14B to store a copy (e.g., instance) of the demanded data block 56 retrieved from the memory array 28 in a memory-side cache 24B (process block 140) and to output (e.g., return) the demanded data block 56 to the processor-side of the computing system 10 via the memory bus 20A (process block 134). In this manner, a memory-side memory sub-system 14B may operate to return a data block 56 demanded by a processor-side of a computing system 10.

Returning to the process 108 of FIG. 8, once the demanded data block is returned from the memory-side of the computing system 10, the processor-side memory controller 34A may determine whether a processor-side cache bypass is enabled, for example, using the process 142 described in FIG. 10. When the processor-side cache bypass is enabled, the processor-side memory controller 34A may instruct the processor-side memory sub-system 14A to supply the demanded data block 56 directly to one or more registers 22 of the processing circuitry 16 (process block 122). On the other hand, when the processor-side cache bypass is not enabled (e.g., disabled), the processor-side memory controller 34A may instruct the processor-side memory sub-system 14A to store a copy (e.g., instance) of the demanded data block 56 returned from the memory-side of the computing system 10 in a processor-side cache 24A (process block 124) and to output the demanded data block 56 to one or more registers 22 of the processing circuitry 16 (process block 114).

In this manner, a processor-side of a computing system 10 may operate to return a data block 56 demanded by a processing sub-system 12 of the computing system 10. As described above, in some embodiments, a processing sub-system 12 may additionally or alternatively demand storage of a data block 56 in a memory sub-system 14, for example, via a write (e.g., demand) memory access request. In other words, in response to receipt of a write memory access request, the memory sub-system 14 may store a data block received along with and/or included in the write memory access request in one or more memory levels implemented therein.

Figure 11:
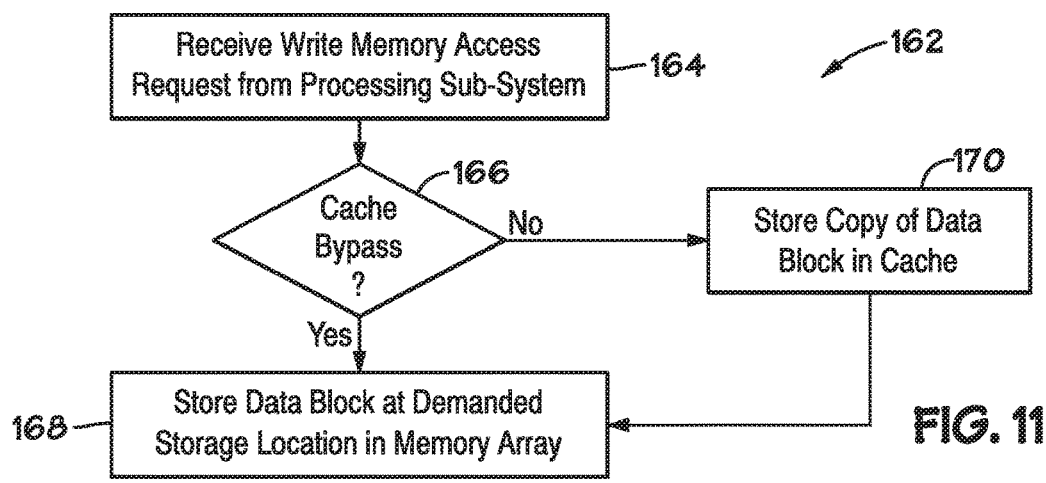
FIG. 11 is a flow diagram of an example process for operating the memory sub-system of FIG. 1 in response to a write memory access request, in accordance with an embodiment of the present disclosure.

To help illustrate, an example of a process 162 for operating a memory sub-system 14 is described in FIG. 11. Generally, the process 162 includes receiving a write memory access request from a processing sub-system (process block 164), determining whether a cache bypass is enabled (decision block 166), and storing a data block at a demanded storage location in a memory array (process block 168). Additionally, when the cache bypass is not enabled, the process 162 includes storing a copy of the data block in a cache (process block 170).

Although described in a particular order, which represents a particular embodiment, it should be noted that the process 162 may be performed in any suitable order. Additionally, embodiments of the process 162 may omit process blocks and/or include additional process blocks. Moreover, in some embodiments, the process 162 may be implemented at least in part by executing instructions stored in a tangible, non-transitory, computer-readable medium, such as memory implemented in a memory controller 34, using processing circuitry, such as a processor implemented in the memory controller 34.

Accordingly, in some embodiments, a (e.g., memory-side and/or processor-side) memory controller 34 implemented in a memory sub-system 14 of a computing system 10 may receive a write (e.g., demand) memory access request output from a processing sub-system 12 of the computing system 10 (process block 164). For example, a processor-side memory controller 34A may receive the write memory access request via one or more processor-side internal buses 20B. Additionally or alternatively, a memory-side bus interface 70 may receive the write memory access request from a memory bus 20A and route the write memory access request to a memory-side memory controller 34B via one or more memory-side internal buses 20C.

In any case, the memory controller 34 may then determine whether a (e.g., processor-side and/or memory-side) cache bypass is enabled, for example, using the process 142 described in FIG. 10. When the cache bypass is not enabled, the memory controller 34 may instruct the memory sub-system 14 to store a data block 56 received along with and/or included in the write memory access request in one or more caches 24 (e.g., dedicated lower memory levels 50) (process block 170) as well as at a storage location in a memory array 28 demanded (e.g., targeted) by the write memory access request (process block 168). In some embodiments, the memory controller 34 may determine the demanded storage location based at least in part on one or more write access parameters included in the write memory access request.

On the other hand, when the cache bypass is enabled, the memory controller 34 may instruct the memory sub-system 14 to store the data block 56 received along with and/or included in the write memory access request at the demanded storage location in the memory array 28, for example, without storing a copy of the data block in the one or more caches 24 (process block 168). In this manner, a memory sub-system 14 may operate to selectively disable caching of a data block 56, which is demanded for storage in a memory array 28, based at least in part on memory array state information 96 indicative of a current state of the memory array 28 and/or the current state of one or more memory pages (e.g., memory cell rows 88) in the memory array 28. In some embodiments, a memory sub-system 14 may additionally or alternatively selectively disable pre-fetching of a data block 56 from a memory array 28 to a dedicated lower (e.g., cache and/or pre-fetch buffer) memory level 50 based at least in part on memory array state information 96 indicative of a current state of the memory array 28 and/or the current state of one or more memory pages in the memory array 28.

Figure 12:
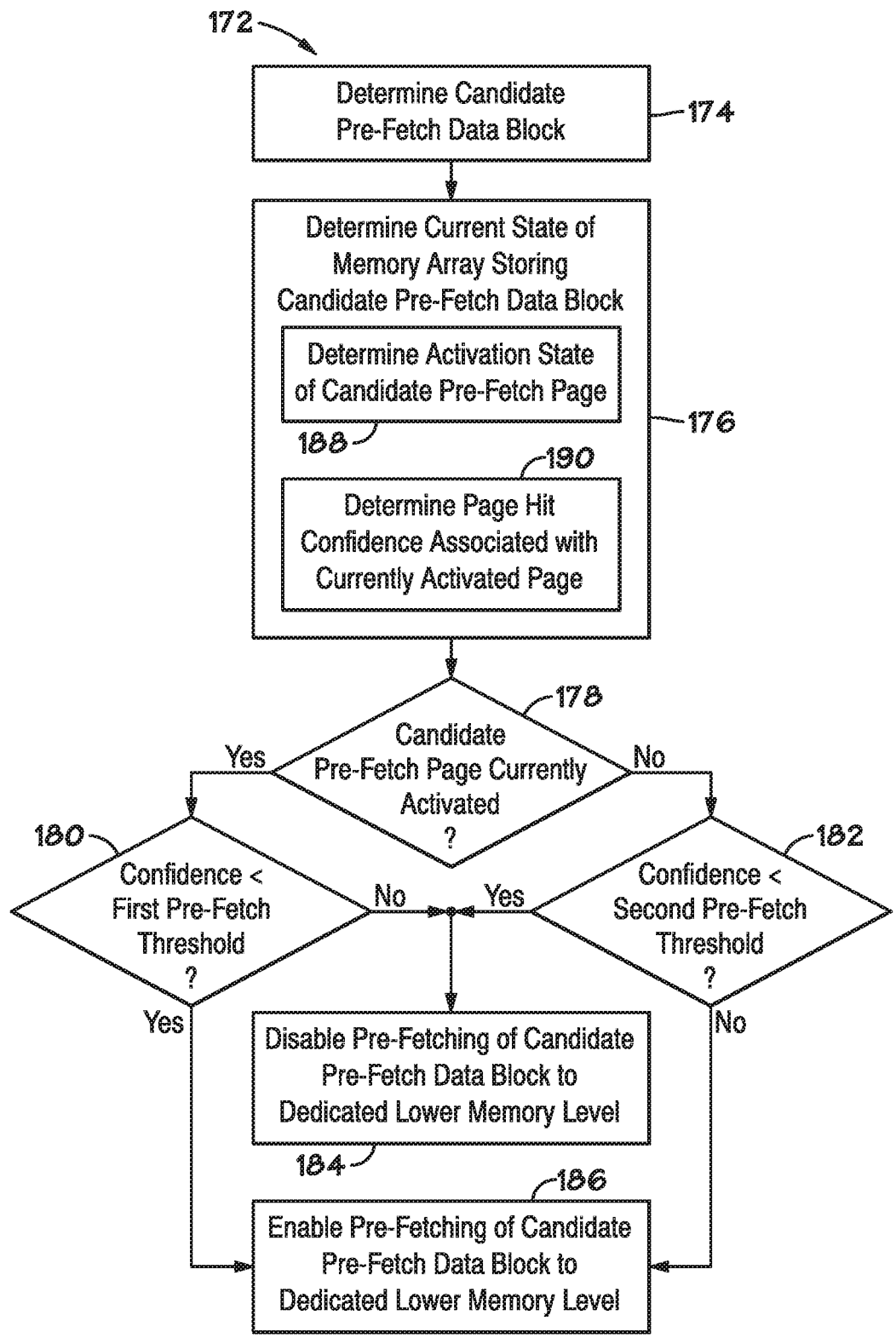
FIG. 12 is a flow diagram of an example process for determining whether to enable pre-fetching to the dedicated lower memory level of FIG. 3, in accordance with an embodiment of the present disclosure.

To help illustrate, an example of a process 172 for selectively disabling pre-fetching to a dedicated lower (e.g., cache and/or pre-fetch buffer) memory level 50 is described in FIG. 12. Generally, the process includes determining a candidate pre-fetch data block (process block 174), determining a current state of a memory array storing the candidate pre-fetch data block (process block 176), and determining whether a candidate pre-fetch memory page is currently activated (decision block 178). Additionally, the process 172 includes determining whether a next target confidence associated with a currently activated memory page is less than a first pre-fetch confidence threshold when the candidate pre-fetch memory page is currently activated (decision block 180) and determining whether the next target confidence associated with the currently activated memory page is greater than a second pre-fetch confidence threshold when the candidate pre-fetch memory page is not currently activated (decision block 182).

Furthermore, the process 172 includes disabling pre-fetching of the candidate pre-fetch data block to a dedicated lower memory level when the candidate pre-fetch memory page is currently activated and the next target confidence associated with the currently activated memory page is not less than the first pre-fetch confidence threshold or when the candidate pre-fetch memory page is not currently activated and the next target confidence associated with the currently activated memory page is greater than the second pre-fetch confidence threshold (process block 184). Moreover, the process 172 includes enabling pre-fetching of the candidate data block to the dedicated lower memory level when the candidate pre-fetch memory page is currently activated and the next target confidence associated with the currently activated memory page is less than the first pre-fetch confidence threshold or when the candidate pre-fetch memory page is not currently activated and the next target confidence associated with the currently activated memory page is not greater than the second pre-fetch confidence threshold (process block 186).

Although described in a particular order, which represents a particular embodiment, it should be noted that the process 172 may be performed in any suitable order. Additionally, embodiments of the process 172 may omit process blocks and/or include additional process blocks. Moreover, in some embodiments, the process 172 may be implemented at least in part by executing instructions stored in a tangible, non-transitory, computer-readable medium, such as memory implemented in a memory controller 34, using processing circuitry, such as a processor implemented in the memory controller 34.

Accordingly, in some embodiments, a (e.g., memory-side and/or processor-side) memory controller 34 may determine a candidate data block 56 to be considered for pre-fetching to a dedicated lower (e.g., cache and/or pre-fetch buffer) memory level 50 (process block 144). As described above, in some embodiments, a candidate data block 56 may be targeted for pre-fetching by a pre-fetch (e.g., read) memory access request. Thus, at least in such embodiments, the memory controller 34 may identify a storage location in a memory array 28 at which the candidate data block 56 targeted for pre-fetching is expected to be stored based at least in part on one or more read access parameters included in the pre-fetch memory access request. In other words, in response to receipt of a pre-fetch memory access request, in some embodiments, the memory controller 34 may determine a candidate pre-fetch memory page in which the candidate data block 56 is stored based at least in part on one or more of its read (e.g., pre-fetch) access parameters.

Additionally, the memory controller 34 may determine a current state of a memory array 28 including the candidate pre-fetch memory page (process block 176). As described above, in some embodiments, the current state of a memory array 28 may be indicated via corresponding memory array state information 96. Additionally, as described above, in some embodiments, memory array state information 96 associated with a memory array 28 may include memory page state information (e.g., entries 98) indicative of a current state of one or more memory pages (e.g., memory cell rows 88) in the memory array 28.

Moreover, as described above, in some embodiments, memory page state information associated with a memory page may include an activation state parameter, which indicates whether the memory page is currently in its activated state or its deactivated state, and a page hit confidence parameter, which is indicative of the confidence (e.g., likelihood and/or probability) that a subsequent (e.g., next successive) memory access request will target the memory page. Thus, at least in such embodiments, the memory controller 34 may determine (e.g., predict) the confidence that a subsequent memory access request will target a currently activated memory page based at least in part on the value of a page hit confidence parameter indicated in associated memory page state information (process block 188). Additionally, at least in such embodiments, the memory controller 34 may determine a current activation state of the candidate pre-fetch memory page (process block 190) and, thus, whether the candidate pre-fetch memory page is the currently activated memory page or a currently deactivated memory page based at least in part on the value of an activation state parameter indicated in associated memory page state information (decision block 178).

When the candidate pre-fetch memory page is the activated memory page, the memory controller 34 may selectively disable pre-fetching based at least in part on a comparison of an associated page hit confidence parameter and a first pre-fetch confidence threshold (decision block 180). In some embodiments, the value of the first pre-fetch confidence threshold may differ from the value of a first cache confidence threshold, which is used to selectively disable caching when a demanded (e.g., targeted) memory page is currently activated. For example, the value of the first pre-fetch confidence threshold may be greater than the value of the first cache confidence threshold or vice versa. In other embodiments, the value of the first pre-fetch confidence threshold may match the value of the first cache confidence threshold.

In any case, when the candidate pre-fetch memory page is the activated memory page and the value of an associated page hit confidence parameter is less than the first pre-fetch confidence threshold, the memory controller 34 may determine (e.g., predict) that a subsequent (e.g., next successive) memory access request is expected (e.g., more likely than not) to target a different (e.g., currently deactivated) memory page and, thus, the (e.g., candidate pre-fetch and/or currently activated) memory page storing the candidate pre-fetch data block 56 is expected to be in its deactivated state when subsequently targeted. As such, when the value of the associated page hit confidence parameter is less than the first pre-fetch confidence threshold, the memory controller 34 may enable (e.g., fulfill) pre-fetching of the candidate data block 56 from the memory array 28 such that a copy of the candidate data block 56 is stored in a dedicated lower memory level 50, such as a dedicated cache 24 and/or a dedicated pre-fetch buffer 32 (process block 186). At least in some instances, selectively enabling pre-fetching in this manner may facilitate improving computing system operational efficiency, for example, by enabling the candidate data block 56, if subsequently targeted, to be supplied from the dedicated lower memory level 50 instead of a memory page in the memory array 28 that is expected to be in its deactivated state.

Conversely, when the candidate pre-fetch memory page is the activated memory page and the value of an associated page hit confidence parameter is not less than the first pre-fetch confidence threshold, the memory controller 34 may determine (e.g., predict) that a subsequent (e.g., next successive) memory access request is expected (e.g., more likely than not) to target the same memory page and, thus, the (e.g., candidate pre-fetch and/or currently activated) memory page storing the candidate data block 56 is expected to be in its activated state when access us subsequently targeted. As such, when the value of the associated page hit confidence parameter is not less than the first pre-fetch confidence threshold, the memory controller 34 may disable (e.g., block and/or cancel) pre-fetching of the candidate data block 56 from the memory array 28 to the dedicated lower (e.g., cache and/or pre-fetch buffer) memory level 50 (process block 184). At least in some instances, selectively disabling pre-fetching in this manner may facilitate improving computing system operational efficiency, for example, by reducing likelihood of polluting the dedicated lower memory level 50 and instead enabling the candidate data block 56, if subsequently demanded, to be supplied from a memory page that is expected to be in its activated state.

On the other hand, when the candidate pre-fetch memory page is a deactivated memory page, the memory controller 34 may selectively disable pre-fetching based at least in part on a comparison of a page hit confidence parameter associated with a currently activated memory page and a second pre-fetch confidence threshold (decision block 182). In some embodiments, the value of the second pre-fetch confidence threshold may differ from the value of a second cache confidence threshold, which is used to selectively disable caching when a demanded (e.g., targeted) memory page is in its deactivated state. For example, the value of the second pre-fetch confidence threshold may be greater than the value of the second cache confidence threshold or vice versa. In other embodiments, the value of the second pre-fetch confidence threshold may match the value of the second cache confidence threshold.

In any case, when the candidate pre-fetch memory page is a deactivated memory page and the value of a page hit confidence parameter associated with a currently activated memory page is greater than the second cache confidence threshold, the memory controller 34 may determine (e.g., predict) that a subsequent (e.g., next successive) memory access request is expected (e.g., more likely than not) to target the currently activated memory page and, thus, the (e.g., candidate pre-fetch and/or currently deactivated) memory page storing the candidate data block 56 is expected to be in its deactivated state when subsequently targeted. As such, when the value of the page hit confidence parameter associated with the currently activated memory page is greater than the second pre-fetch confidence threshold, the memory controller 34 may disable (e.g., block and/or cancel) pre-fetching of the candidate data block 56 from the memory array 28 to the dedicated lower (e.g., cache and/or pre-fetch buffer) memory level 50 (process block 184). At least in some instances, selectively disabling pre-fetching in this manner may facilitate improving computing system operational efficiency, for example, by reducing likelihood of the candidate data block 56 polluting the dedicated lower memory level 50 and/or obviating power consumption resulting from activating the candidate pre-fetch (e.g., currently deactivated) memory page and subsequently re-activating the currently activated memory page.

Conversely, when the candidate pre-fetch memory page is a deactivated memory page and the value of a page hit confidence parameter associated with a currently activated memory page is not greater than the second pre-fetch confidence threshold, the memory controller 34 may determine (e.g., predict) that a subsequent memory access request is expected to target a (e.g., currently deactivated) memory page different from the currently activated memory page. However, since a memory array 28 may concurrently include multiple deactivated memory pages, at least in some instances, such a determination may have limited relevance to whether the candidate pre-fetch memory page will be in its activated state or its deactivated state when targeted by a subsequent memory access request. As such, when the value of the page hit confidence parameter is not greater than the second pre-fetch confidence threshold, the memory controller 34 may enable (e.g., fulfill) pre-fetching of the candidate data block 56 from the memory array 28 such that a copy of the candidate data block 56 is stored in the dedicated lower (e.g., pre-fetch buffer and/or cache) memory level 50. At least in some instances, selectively enabling pre-fetching in this manner may facilitate improving computing system operational efficiency, for example, by enabling the candidate data block 56, if subsequently targeted, to be supplied from the dedicated lower memory level 50 instead of the memory array 28.

Nevertheless, in other embodiments, the memory controller 34 may automatically enable pre-fetching to a dedicated lower memory level when the candidate pre-fetch memory page is in its deactivated state. Moreover, in some embodiments, the value of the first pre-fetch confidence threshold, which is used when the candidate pre-fetch memory page is in its activated state, and the value of the second pre-fetch confidence threshold, which is used when the candidate pre-fetch memory page is in its deactivated state, may differ. For example, the value of the first pre-fetch confidence threshold may be greater than the value of the second pre-fetch confidence threshold or vice versa. In other embodiments, the value of the first pre-fetch confidence threshold may match the value of the second pre-fetch confidence threshold.

In this manner, a (e.g., memory-side and/or processor-side) memory sub-system 14 may operate to selectively disable pre-fetching from a memory array based at least in part on a current state of the memory array 28. In other words, in some embodiments, a (e.g., memory-side and/or processor-side) memory controller 34 of the memory sub-system 14 may selectively disable fulfillment of one or more pre-fetch (e.g., read) memory access requests based at least in part on memory array state information 96 indicative of the current state of the memory array 28 and/or the current state of one or more memory pages in the memory array 28. Moreover, as described above, in some embodiments, a memory controller 34 may be implemented using multiple controllers (e.g., control circuitry and/or control logic).

Figure 13:
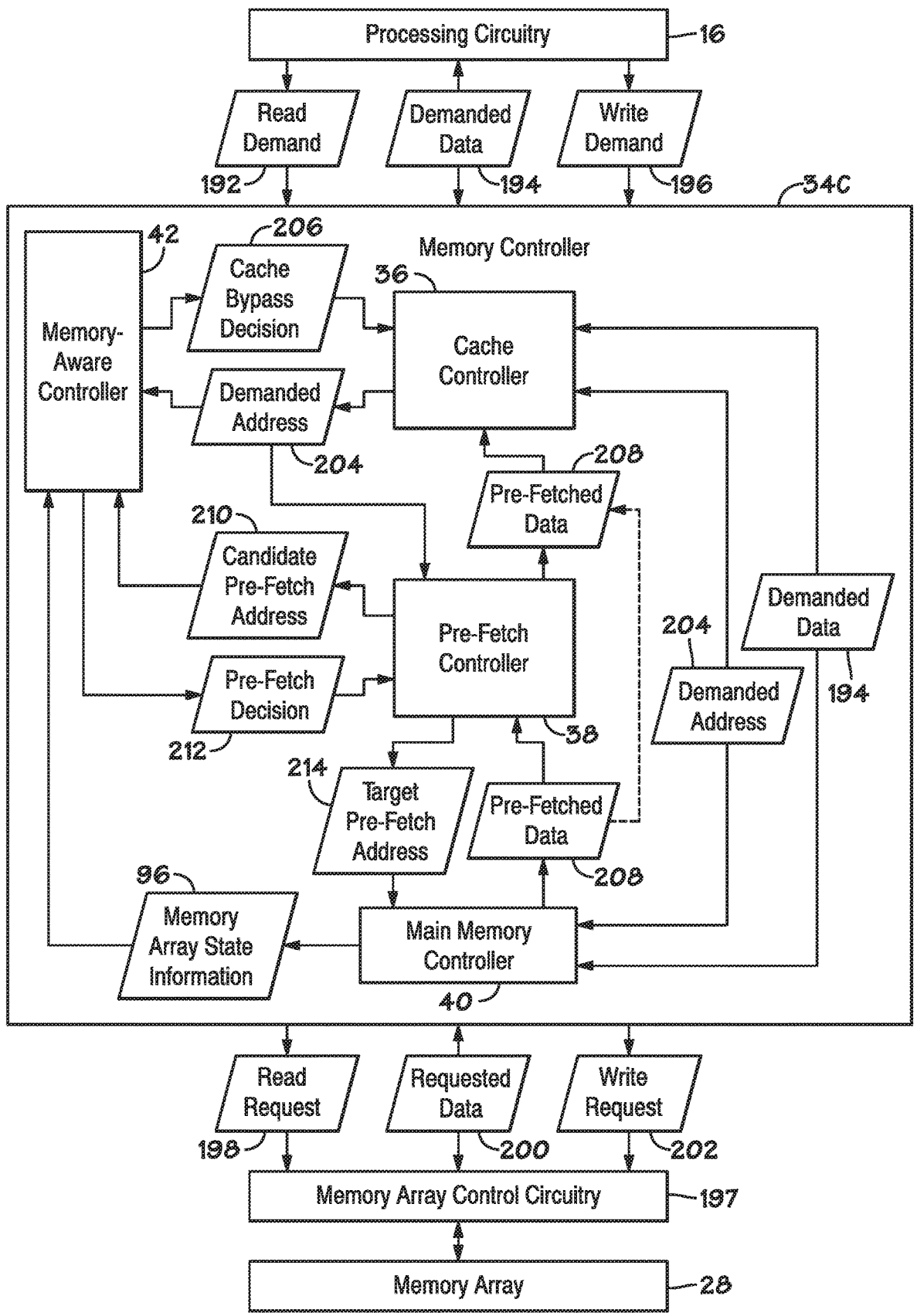
FIG. 13 is a block diagram of a portion of the computing system of FIG. 1 including a memory controller implemented using a pre-fetch controller, a cache controller, a main memory controller, and a memory-aware controller, in accordance with an embodiment of the present disclosure.

To help illustrate, an example of a portion of a computing system 10, which includes a memory controller 34C implemented using multiple controllers, is shown in FIG. 13. In particular, as depicted, the memory controller 34C includes a cache controller 36, a pre-fetch controller 38, a main (e.g., DRAM) memory controller 40, and a memory-aware controller 42. However, it should be appreciated that the depicted example is merely intended to be illustrative and not limiting. For example, in other embodiments, a memory controller 34 may be implemented with fewer than four controllers or more than four controllers.

In some embodiments, the memory controller 34C may be implemented at least in part on a processor-side of the computing system 10, for example, as a processor-side memory controller 34A. Thus, as in the depicted example, the memory controller 34C may be communicatively coupled to processing circuitry 16 of a processing subsystem 12 implemented on the processor-side of the computing system 10, for example, via one or more processor-side internal buses 20B. In this manner, as in the depicted example, the memory controller 34C may receive a read (e.g., retrieval) demand 192, which targets return of corresponding demanded data 194 from a memory sub-system 14, and/or a write (e.g., storage) demand 196, which targets storage of corresponding demanded data 194 in the memory sub-system 14, from the processing circuitry 16.

Additionally or alternatively, the memory controller 34C may be implemented at least in part on a memory-side of the computing system 10, for example, as a memory-side memory controller 34B. Thus, as in the depicted example, the memory controller 34C may be communicatively coupled to control circuitry 197, such as row select circuitry 76 and/or column select circuitry 78, of a memory array 28 implemented on the memory-side of the computing system, for example, via one or more memory-side internal buses 20C. In this manner, as in the depicted example, the memory controller 34C may output a read (e.g., retrieval) request 198, which targets return of corresponding requested data 200 from the memory array 28, and/or a write (e.g., storage) request 202, which requests storage of corresponding requested data 200 in the memory array 28, to the control circuitry 197 of the memory array 28.

In fact, in some embodiments, a portion of the memory controller 34C may be implemented on the processor-side of the computing system 10 while another portion of the memory controller 34C may be implemented on the memory-side of the computing system 10. In other words, at least in such embodiments, the portion of the memory controller 34C implemented on the processor-side of the computing system 10 and the portion of the memory controller 34C implemented on the memory-side of computing system 10 may be communicatively coupled via a memory (e.g., external communication) bus 20A. Merely as an illustrative and non-limiting example, the main memory controller 40 may be implemented on the memory-side of the computing system 10 while the cache controller 36, the pre-fetch controller 38, and the memory-aware controller 42 are implemented on the processor-side of the computing system 10.

As described above, in some embodiments, a main memory controller 40, such as a DRAM memory controller 34, may generally control operation of a memory array 28 and, thus, a corresponding memory array memory level. For example, the main memory controller 40 may selectively instruct the control circuitry 197 (e.g., row select circuitry 76) coupled to the memory array 28 to activate a memory page (e.g., memory cell row 88) or to deactivate the memory cell page. Additionally or alternatively, the main memory controller 40 may selectively instruct the control circuitry 197 (e.g., column select circuitry 78) to provide (e.g., enable) or to block (e.g., disable) access (e.g., reading or writing) to a storage location (e.g., memory array) in an activated memory page. Thus, as in the depicted example, the main memory controller 40 determine memory array state information 96 indicative of a current state of the memory array 28 and/or the current state of one or more memory pages in the memory array 28.

To facilitate improving computing system operational efficiency, as described above, in some embodiments, a memory-aware controller 42 may selectively disable caching (e.g., enable cache bypassing) of demanded data 194 in a dedicated cache 24 based at least in part a current state of a memory array 28. For example, the memory-aware controller 42 may selectively disable caching of demanded data 194 that is targeted for storage at a demanded memory address 204 in the memory array 28 by a write demand 196 received from the processing circuitry 16. Additionally or alternatively, the memory-aware controller 42 may selectively disable caching (e.g., enable cache bypassing) of demanded data 194 that is retrieved from a demanded memory address 204 in the memory array 28 in response to receipt of a read demand 192 from the processing circuitry 16.

Furthermore, as described above, in some embodiments, a cache controller 36 may generally control operation (e.g., data storage) of one or more caches 24 and, thus, corresponding cache (e.g., dedicated lower) memory levels. Accordingly, as in the depicted example, the cache controller 36 may output one or more demanded memory addresses 204, for example, in response to receipt of a read demand 192 and/or a write demand 196 targeting corresponding demanded data 194. Based at least in part on the memory array state information 96 associated with a currently activated memory page in the memory array 28 and/or a memory page that includes a currently demanded memory address 204, the memory-aware controller 42 may return a cache bypass decision 206 that indicates whether storage (e.g., caching) of demanded data 194 associated with the demanded memory address 204 in a dedicated cache 24 is enabled (e.g., cache bypass disabled) or disabled (e.g., cache bypass enabled).

Moreover, as described above, a dedicated lower memory level 50, such as a cache 24 and/or a pre-fetch buffer 32, generally provides faster data access speed compared to a memory array 28 (e.g., higher memory level). As such, to facilitate improving computing system operational efficiency, in some embodiments, the memory controller 34C may attempt to retrieve demanded data 194 targeted by a read demand 192 from dedicated lower memory levels 50 implemented in the computing system 10 before progressing to the memory array 28. Thus, as in the depicted example, the cache controller 36 may output a demanded memory address 204 to the main memory controller 40, for example, at least when associated demanded data 194 results in a miss in each of the dedicated lower memory levels 50.

Based at least in part on a demanded memory address 204, the main memory controller 40 may output a read request 198 that targets return of corresponding demanded data 194 from the memory array 28, for example, as a demand (e.g., read) memory access request. In other words, requested data 200 retrieved from the memory array 28 in response to the read (e.g., demand) request 198 may include demanded data 194 targeted by the processing circuitry 16. Thus, as in the depicted example, the main memory controller 40 may output demanded data 194 retrieved from the memory array 28 to the cache controller 36, for example, to facilitate improving computing system operational efficiency by enabling the cache controller 36 to selectively disable caching of the demanded data 194 in a dedicated cache 24 based on the cache bypass decision 206 received from the memory-aware controller 42.

As described above, to facilitate further improving computing system operational efficiency, in some embodiments, a memory controller 34 may additionally or alternatively output a read request 198 that targets return of corresponding requested data 200 from the memory array 28 before the requested data 200 is actually demanded by the processing circuitry 16, for example, as a pre-fetch (e.g., read) memory access request. In other words, requested data 200 retrieved from the memory array 28 in response to the read (e.g., pre-fetch) request 198 may include pre-fetched data 208 that has not yet been demanded by the processing circuitry 16. Furthermore, as described above, in some embodiments, pre-fetched data 208 may be stored in one or more dedicated lower (e.g., cache and/or pre-fetch buffer) memory levels 50 implemented in the computing system 10.

Moreover, as described above, in some embodiments, a pre-fetch controller 38 may generally control operation (e.g., data storage) in one or more dedicated pre-fetch buffers 32 and, thus, corresponding pre-fetch buffer (e.g., dedicated lower) memory levels. Additionally or alternatively, as described above, the cache controller 36 may generally control operation in one or more dedicated caches 24. Thus, as in the depicted example, the main memory controller 40 may output pre-fetched data 208 to the pre-fetch controller 38 and/or directly to the cache controller 36.

However, to facilitate improving computing system operational efficiency, as described above, in some embodiments, the memory-aware controller 42 may selectively disable pre-fetching of data from a memory array 28 to a dedicated lower (e.g., cache and/or pre-fetch buffer) memory level 50 based at least in part the current state of the memory array 28. In particular, as in the depicted example, the memory-aware controller 42 may receive a candidate pre-fetch memory address 210 from the pre-fetch controller 38. In some embodiments, the pre-fetch controller 38 may identify the candidate pre-fetch memory address 210 based at least in part on one or more previously demanded memory addresses 204, for example, by determining a previous data access pattern based at least in part on the one or more previously demanded memory addresses 204 and predicting a subsequent data access pattern including the candidate pre-fetch memory address 210 based at least in part on the previous data access pattern.

Based at least in part on the memory array state information 96 associated with a currently activated memory page in the memory array 28 and/or a memory page that includes a candidate pre-fetch memory address 210, the memory-aware controller 42 may return a pre-fetch decision 212 that indicates whether pre-fetching from the candidate pre-fetch memory address 210 is enable or disabled. When disabled, the pre-fetch controller 38 may cancel pre-fetching from the candidate pre-fetch memory address 210, for example, by blocking supply of the candidate pre-fetch memory address 210 to the main memory controller 40. On the other hand, when pre-fetching is enabled, the pre-fetch controller 38 may output a corresponding candidate pre-fetch memory address 210 to the main memory controller 40 as a target pre-fetch memory address 214. Based at least in part on a target pre-fetch memory address 214, the main memory controller 40 may output a read (e.g., pre-fetch) request 198 that targets return of corresponding pre-fetched data 208 from the memory array 28, for example, as a pre-fetch (e.g., read) memory access request.

In this manner, the techniques described in the present disclosure may enable a memory sub-system to selectively disable pre-fetching of data, which is stored in a memory array (e.g., higher memory level), to a dedicated lower memory level, such as a cache and/or a pre-fetch buffer, based at least in part on a current state of the memory array. Additionally or alternatively, as described above, the techniques described in the present disclosure may enable a memory sub-system to selectively disable caching of data, which is demanded for storage in a memory array (e.g., higher memory level) and/or demanded for retrieval from the memory array, in a cache (e.g., dedicated lower memory level) based at least in part on a current state of the memory array. As described above, at least in some instances, implementing and/or operating a memory sub-system to selectively disable pre-fetching and/or caching in this manner may facilitate improving operational efficiency of the memory sub-system and, thus, a computing system in which the memory sub-system is deployed, for example, by reducing pollution in a dedicated lower (e.g., cache and/or pre-fetch buffer) memory level and/or reducing power consumption resulting from activation of memory pages in a memory array.

One or more specific embodiments of the present disclosure are described herein and depicted in the corresponding figures. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An apparatus comprising:
    a first hierarchical memory level comprising a memory array;
    a second hierarchical memory level comprising a cache, a pre-fetch buffer, or both; and
    a memory controller configured to be communicatively coupled to a memory bus, wherein the memory controller is configured to:
        determine first state information associated with a memory page in the memory array targeted by a first memory access request received via the memory bus, wherein the first state information comprises:
            a first parameter indicative of a current activation state of the memory page; and
            a second parameter indicative of statistical likelihood that a subsequent memory access request will target the memory page, wherein the second parameter is determined based on one or more previously determined counter values each indicating a number of consecutive memory access requests previously targeting the memory page; and
        disable storage of data associated with the memory page in the second hierarchical memory level when the first parameter in the first state information associated with the memory page indicates that the memory page is an activated memory page and the second parameter in the first state information associated with the memory page is greater than or equal to a first threshold.

2. The apparatus of claim 1, wherein the memory controller is configured to instruct the apparatus to store a copy of the data associated with the memory page in the second hierarchical memory level when the first parameter in the first state information associated with the memory page indicates that the memory page is the activated memory page and the second parameter in the first state information associated with the memory page is less than the first threshold.

3. The apparatus of claim 1, wherein, when the first parameter in the first state information associated with the memory page indicates that the memory page is not the activated memory page, the memory controller is configured to:
    determine second state information associated with the activated memory page in the memory array, wherein the second state information comprises a third parameter indicative of statistical likelihood that the subsequent memory access request will target the activated memory page;
    disable storage of the data associated with the memory page in the second hierarchical memory level when the third parameter in the second state information associated with the activated memory page is greater than a second threshold; and
    instruct the apparatus to store a copy of the data associated with the memory page in the second hierarchical memory level when the third parameter in the second state information associated with the activated memory page is less than or equal to the second threshold.

4. The apparatus of claim 1, wherein the memory controller is configured to enable storage of a copy of the data associated with the memory page in the second hierarchical memory level when first parameter in the first state information associated with the memory page indicates that the memory page is a deactivated memory page.

5. The apparatus of claim 1, wherein, when the memory page is transitioned from a deactivated state to an activated state, the memory controller is configured to:
    update the first parameter in the first state information associated with the memory page to indicate that the memory page is in the activated state;

reset the counter value; and
increment the counter value when a second memory access request to be fulfilled directly after the first memory access request targets the memory page.

6. The apparatus of claim 5, wherein, when the memory page is subsequently transitioned from the activated state to the deactivated state, the memory controller is configured to:
update the first parameter in the first state information associated with the memory page to indicate that the memory page is in the deactivated state; and
update a value of the second parameter in the first state information associated with the memory page based at least in part on the counter value resulting when the memory page is transitioned to the deactivated state.

7. The apparatus of claim 5, wherein the memory controller is configured to:
retrieve a first value of the second parameter in the first state information associated with the memory page when the memory page is transitioned from the deactivated state to the activated state; and
update the second parameter in the first state information associated with the memory page by overwriting the first value of the second parameter with a second value determined based at least in part on an average of the first value retrieved when the memory page is initially transitioned to the activated state and the counter value resulting when the memory page is subsequently transitioned to the deactivated state.

8. The apparatus of claim 1, wherein, when the first memory access request comprises a write memory access request that demands that the data be stored at least in the memory array, the memory controller is configured to:
disable storage of the data in the second hierarchical memory level at least in part by enabling a cache bypass;
instruct the apparatus to store a copy of the data in the second hierarchical memory level when the cache bypass is not enabled; and
instruct the apparatus to store the data at a memory address in the memory page demanded by the write memory access request without storing the copy of the data in the second hierarchical memory level when the cache bypass is enabled.

9. The apparatus of claim 1, comprising processing circuitry communicatively coupled to the memory controller, wherein, when the first memory access request comprises a read memory access request that demands return of the data associated with the memory page, the memory controller is configured to:
disable storage of the data in the second hierarchical memory level at least in part by enabling a cache bypass;
instruct the memory array to output the data demanded by the read memory access request from the memory page when the data is not currently stored in the second hierarchical memory level;
instruct the apparatus to store a copy of the data output from the memory array in the second hierarchical memory level when the cache bypass is not enabled; and
instruct the apparatus to return the data output from the memory array to the processing circuitry without storing the copy of the data in the second hierarchical memory level when the cache bypass is enabled.

10. The apparatus of claim 1, wherein:
the first memory access request comprises a pre-fetch memory access request that targets pre-fetching of the data from a memory address in the memory page; and
the memory controller is configured to disable storage of the data in the second hierarchical memory level at least in part by blocking fulfillment of the pre-fetch memory access request.

11. A tangible, non-transitory, computer-readable medium storing instructions executable by control circuitry of a computing system, wherein the instructions comprise instructions to:
determine, using the control circuitry, a memory address in a memory array to which processing circuitry in the computing system is demanding access;
instruct, using the control circuitry, the computing system to provide access to a demanded memory page in the memory array comprising the memory address demanded by the processing circuitry;
determine, using the control circuitry, a current activation state of the demanded memory page comprising the memory address demanded by the processing circuitry; and
in response to determining that the current activation state of the demanded memory page is an activated state:
predict, using the control circuitry, a first statistical likelihood that a next memory address to be targeted directly after the memory address demanded by the processing circuitry will be in the demanded memory page, wherein the first statistical likelihood is determined based on one or more previously determined counter values each indicating a number of consecutive memory access requests previously targeting the memory page; and
enable, using the control circuitry, a cache bypass to disable caching of a data block associated with memory address demanded by the processing circuitry in response to determining that the first statistical likelihood that the next memory address to be targeted directly after the memory address demanded by the processing circuitry will be in the demanded memory page is greater than a first cache threshold.

12. The tangible, non-transitory, computer-readable medium of claim 11, comprising instructions to disable, using the control circuitry, the cache bypass to enable caching of the data block associated with memory address demanded by the processing circuitry in response to determining that the current activation state of the demanded memory page is the activated state and the first statistical likelihood that the next memory address to be targeted directly after the memory address demanded by the processing circuitry will be in the demanded memory page is less than or equal to the first cache threshold.

13. The tangible, non-transitory, computer-readable medium of claim 11, comprising instructions to, in response to determining that the current activation state of the demanded memory page is not the activated state:
predict, using the control circuitry, a second statistical likelihood that the next memory address to be targeted directly after the memory address demanded by the processing circuitry will be in a currently activated memory page in the memory array; and
enable, using the control circuitry, the cache bypass to disable caching of the data block associated with the memory address demanded by the processing circuitry in response to determining that the second statistical likelihood that the next memory address to be targeted directly after the memory address demanded by the processing circuitry will be in the currently activated memory page is not less than a second cache threshold.

14. The tangible, non-transitory, computer-readable medium of claim 13, comprising instructions to disable, using the control circuitry, the cache bypass to enable caching of the data block associated with the memory address demanded by the processing circuitry in response to determining that:
- the second statistical likelihood that the next memory address to be targeted directly after the memory address demanded by the processing circuitry will be in the currently activated memory page is less than the second cache threshold; or
- the current activation state of the demanded memory page is not the activated state.

* * * * *

UNITED STATES PATENT AND TRADEMARK OFFICE
CERTIFICATE OF CORRECTION

PATENT NO. : 11,194,728 B2  
APPLICATION NO. : 16/525106  
DATED : December 7, 2021  
INVENTOR(S) : David Andrew Roberts Page 1 of 1

It is certified that error appears in the above-identified patent and that said Letters Patent is hereby corrected as shown below:

In the Specification

Column 5, Line 6, delete "(e.g., 3D XPoint™) memory" and insert --(e.g., 3D XPoint™ memory)--, therefor.

Column 12, Line 4, delete "prematurely evited from" and insert --prematurely evicted from"--, therefor.

Column 13, Line 12, delete "in its activated memory page" and insert --in its activated state--, therefor.

Column 18, Line 66, delete "processor-side cache 24A cache" and insert --processor-side cache 24A--, therefor.

Column 24, Line 11, delete "28 to be grouped into" and insert --28 can be grouped into--, therefor.

Column 30, Line 12, delete "in its activated state when" and insert --in its deactivated state when--, therefor.

Column 36, Line 43, delete "block 56 being prematurely evited" and insert --block 56 being prematurely evicted--, therefor.

Column 38, Line 43, delete "deactivated state access to the" and insert --deactivated state when access to the--, therefor.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*